US011373397B2

(12) United States Patent
Ross et al.

(10) Patent No.: US 11,373,397 B2
(45) Date of Patent: Jun. 28, 2022

(54) METHODS AND SYSTEMS FOR OPERATING A MOVING PLATFORM TO DETERMINE DATA ASSOCIATED WITH A TARGET PERSON OR OBJECT

(71) Applicant: LGS Innovations LLC, Herndon, VA (US)

(72) Inventors: Michael Ray Ross, Westminster, CO (US); Renato M. Camarda, Fanwood, NJ (US)

( * ) Notice: Subject to any disclaimer, the term of this patent is extended or adjusted under 35 U.S.C. 154(b) by 0 days.

(21) Appl. No.: 16/385,406

(22) Filed: Apr. 16, 2019

(65) Prior Publication Data

US 2020/0334441 A1    Oct. 22, 2020

(51) Int. Cl.
| | |
|---|---|
| *B64C 39/02* | (2006.01) |
| *G06K 9/00* | (2022.01) |
| *G06F 3/00* | (2006.01) |
| *G06V 20/13* | (2022.01) |
| *H04N 5/232* | (2006.01) |
| *B64D 47/08* | (2006.01) |
| *G05D 1/12* | (2006.01) |
| *G08B 25/01* | (2006.01) |
| *G08B 25/10* | (2006.01) |
| *G06T 7/73* | (2017.01) |
| *G06V 10/40* | (2022.01) |
| *G06V 20/20* | (2022.01) |
| *G06V 20/52* | (2022.01) |

(Continued)

(52) U.S. Cl.
CPC ............ *G06V 20/13* (2022.01); *B64C 39/024* (2013.01); *B64D 47/08* (2013.01); *G05D 1/12* (2013.01); *G06T 7/73* (2017.01); *G06V 10/40* (2022.01); *G06V 20/20* (2022.01); *G06V 20/52* (2022.01); *G06V 40/103* (2022.01); *G06V 40/172* (2022.01); *G08B 25/016* (2013.01); *G08B 25/10* (2013.01); *H04N 5/23299* (2018.08); *B64C 2201/123* (2013.01); *B64C 2201/127* (2013.01); *B64C 2201/141* (2013.01); *G06F 3/0484* (2013.01); *G06T 2200/24* (2013.01); *G06V 2201/07* (2022.01)

(58) Field of Classification Search
CPC combination set(s) only.
See application file for complete search history.

(56) References Cited

U.S. PATENT DOCUMENTS 8,930,044 B1    1/2015 Peeters et al.
9,710,709 B1    7/2017 Beard et al.
(Continued)

*Primary Examiner* — Jeffery A Williams
(74) *Attorney, Agent, or Firm* — BakerHostetler; Tayan B. Patel

(57) ABSTRACT

Methods and systems for operating a moving platform to determine data associated with a target person or object are disclosed. In an example method to determine at least one of an object or an activity associated with the target, a first moving platform, configured with a first type of sensor, is caused to move to an area associated with the target. The target is located at the area. An attempt is made to determine, via the first moving platform and the first type of sensor, the at least one of the object or activity. Based on the attempt, a second moving platform, configured with a second type of sensor, is caused to move to the area. The at least one of the object or activity associated with the target is determined via the second moving platform and the second type of sensor.

20 Claims, 8 Drawing Sheets

(51) Int. Cl.
*G06V 40/10* (2022.01)
*G06V 40/16* (2022.01)
G06F 3/0484 (2022.01)

(56) References Cited

U.S. PATENT DOCUMENTS

| | | | | |
|---|---|---|---|---|
| 9,826,415 | B1* | 11/2017 | Byrne | H04W 8/005 |
| 10,013,627 | B1* | 7/2018 | Mishra | G06K 9/00624 |
| 10,209,713 | B1 | 2/2019 | Mola et al. | |
| 10,303,415 | B1* | 5/2019 | Ananthanarayanan | B64C 39/024 |
| 2011/0211084 | A1 | 9/2011 | Sturzel | |
| 2011/0255744 | A1 | 10/2011 | Boncyk et al. | |
| 2014/0172194 | A1 | 6/2014 | Levien et al. | |
| 2016/0122038 | A1 | 5/2016 | Fleischman et al. | |
| 2016/0217578 | A1 | 7/2016 | Can et al. | |
| 2016/0376031 | A1 | 12/2016 | Michalski et al. | |
| 2017/0053169 | A1* | 2/2017 | Cuban | B64C 39/024 |
| 2017/0200759 | A1 | 7/2017 | Ihara et al. | |
| 2017/0293795 | A1 | 10/2017 | Okada | |
| 2017/0300759 | A1* | 10/2017 | Beard | G06K 9/6202 |
| 2017/0313416 | A1* | 11/2017 | Mishra | G05D 1/104 |
| 2017/0337791 | A1 | 11/2017 | Gordon-Carroll | |
| 2018/0094935 | A1 | 4/2018 | O'Brien et al. | |
| 2018/0203470 | A1 | 7/2018 | Pattison et al. | |
| 2019/0236374 | A1* | 8/2019 | Nakagawa | G06K 9/00362 |

* cited by examiner

METHODS AND SYSTEMS FOR OPERATING A MOVING PLATFORM TO DETERMINE DATA ASSOCIATED WITH A TARGET PERSON OR OBJECT

FIELD

This application generally relates to operating a moving platform, in particular operating a moving platform to determine data associated with a target person or object.

BACKGROUND

A moving platform, as used herein, is an aircraft that operates without an on-board human operator. Indeed, a moving platform may be configured for relatively autonomous operation and flight. As such, moving platforms may be used for various sorts of information gathering, aerial photography or videography, surveillance, surveying, and even cargo transport. To accomplish such objective(s), a moving platform may be configured with a variety of sensors. Yet a given moving platform may be limited in the types of sensors that the moving platform may bear. For example, a moving platform may be configured with only a small number of sensors—and of limited types—due to weight considerations. The cost associated with an expansive sensor configuration and the larger moving platform needed to bear such sensor configuration may also be a limiting factor. Thus, a typical moving platform is likely unable to perform its role, particularly those relating to information gathering, photography or videography, surveillance, surveying, or the like, across all possible scenarios and operating conditions.

Thus, what is desired in the art is a technique and architecture for determining, using one or more moving platforms, at least one of an object associated with a target or an activity associated with the target.

What is also desired in the art is a technique and architecture for determining, using one or more moving platforms, an identity of an unidentified target.

What is still further desired in the art is a technique and architecture for determining, using one or more moving platforms, a location of a known target.

SUMMARY

The foregoing needs are met, to a great extent, by the disclosed systems, methods, and techniques for operating a moving platform to determine data associated with a target person or object.

One aspect of the patent application is directed to determining at least one of an object associated with a target or an activity associated with the target. The target may be a target person. An example method includes receiving an instruction to determine the at least one of an object associated with the target or an activity associated with the target. A first moving platform is caused to move to an area associated with the target. The first moving platform is configured with a first type of sensor. The target is located, via the first moving platform, at the area. An attempt is made to determine, via the first moving platform and the first type of sensor, the at least one of an object associated with the target or an activity associated with the target. Based on the attempt to determine the at least one of an object associated with the target or an activity associated with the target, a second moving platform is caused to move to the area. The second moving platform is configured with a second type of sensor that is different from the first type of sensor of the first moving platform. The at least one of an object associated with the target or an activity associated with the target is determined via the second moving platform and the second type of sensor.

Another aspect of the patent application is directed to determining an identity of an unidentified target at a first area. The target may be a target person or a target inanimate object. An example method includes receiving an instruction to determine the identity of the unidentified target at the first area associated with the target. A first moving platform is caused to move to the first area. The first moving platform is configured with a first type of sensor. An attempt is made to determine, via the first moving platform and the first type of sensor, the identity of the target. Based on the attempt to determine the identity of the target, a second moving platform is caused to move to the first area. The second moving platform is configured with a second type of sensor that is different from the first type of sensor of the first moving platform. The identity of the target is determined via the second moving platform and the second type of sensor.

Yet another aspect of the patent application is directed to locating a known target at an area associated with the target. The target may be a target person, a target animal, or a target inanimate object. An example method includes receiving an instruction to locate the known target at the area associated with the target. A first moving platform is caused to move to the area. The first moving platform is configured with a first type of sensor. An attempt is made to locate, via the first moving platform and the first type of sensor, the target at the area. Based on the attempt to locate the target, a second moving platform is caused to move to the area. The second moving platform is configured with a second type of sensor that is different from the first type of sensor of the first moving platform. The target is located via the second moving platform and the second type of sensor.

There has thus been outlined, rather broadly, certain embodiments of the application in order that the detailed description thereof herein may be better understood, and in order that the present contribution to the art may be better appreciated. There are, of course, additional embodiments of the application that will be described below and which will form the subject matter of the claims appended hereto.

BRIEF DESCRIPTION OF THE DRAWINGS

To facilitate a fuller understanding of the application, reference is made to the accompanying drawings, in which like elements are referenced with like numerals. These drawings should not be construed to limit the application and are intended only for illustrative purposes.

DETAILED DESCRIPTION

Figure 1A:
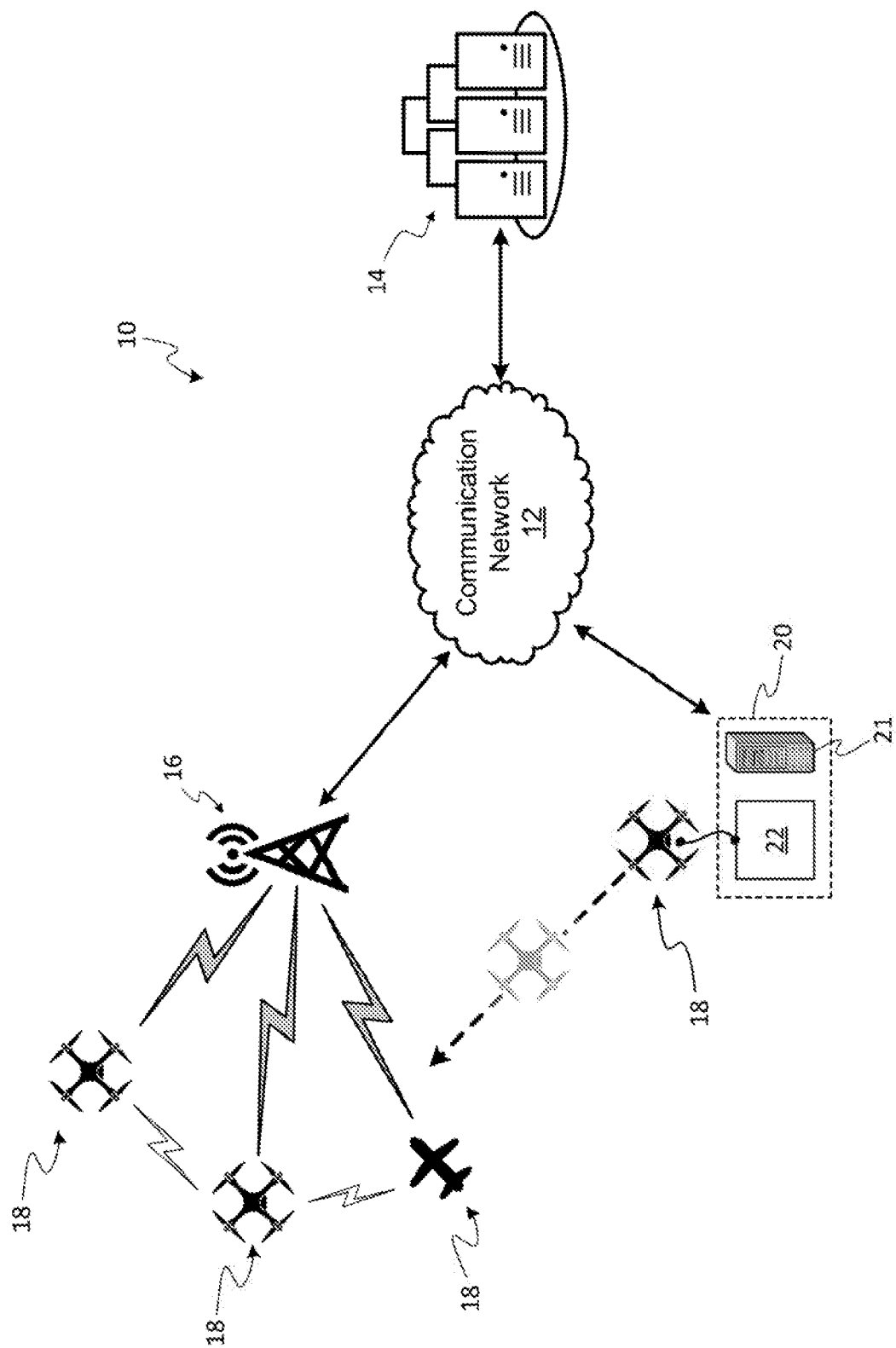
FIG. 1A illustrates a diagram of an example system according to an aspect of the application.

Before explaining at least one embodiment of the application in detail, it is to be understood that the application is not limited in its application to the details of construction and to the arrangements of the components set forth in the following description or illustrated in the drawings. The application is capable of embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not for other embodiments.

FIG. 1A is a diagram of an example system 10 in which one or more disclosed embodiments may be implemented. In the system 10, one or more moving platforms 18 are in mutual communication, via a communication network 12, with a central system 14. A wireless base station 16 may effectuate wireless communication with one or more moving platforms 18 while such moving platforms 18 are in flight. For example, a moving platform 18 may be deployed to track and gather information regarding a target person or object and report such information back to the central system 14 via the wireless base station 16 for processing by the central system 14. Further, while a moving platform 18 is deployed to track a target person or object, the moving platform 18 may communicate via the wireless base station 16 to indicate that another moving platform 18 be deployed to replace the initial moving platform 18 and/or to augment the initial moving platform 18 with additional sensor capabilities. In some instances, a moving platform 18 may relay a message to the wireless base station 16 from another moving platform 18 that is not within range of the wireless base station 16. A moving platform 18 may further communicate with the central system 14 via a wired connection to an intermediate system 20. For instance, a moving platform 18 may be deployed from and communicate with a deployment station 22 of the intermediate system 20. The central system 14 may generally direct operations within the system 10, such as providing instructions to one or more moving platforms 18 to effectuate a mission or task.

A moving platform 18 may generally refer to a device configured for flight and comprising one or more sensors to capture information (e.g., images or video) regarding a target and/or various environmental variables (e.g., wind speed or light level). A moving platform 18 may be configured for generally autonomous operation once provided instructions relating to a mission. For example, a moving platform 18 may capture data and determine further actions based on the captured data. For instance, a moving platform 18 may determine that its visible spectrum camera is insufficient for a mission and transmit a request that a second moving platform 18 be deployed that is configured with an infrared camera. In other instances, a moving platform 18 may transmit data back to the central system 14 for processing. The moving platform 18 may await instructions from the central system 14.

A moving platform 18 may comprise an unmanned aerial vehicle (UAV), such as a drone. A moving platform 18 may be configured as a rotary platform, such as a multirotor drone (e.g., a tricopter, quadcopter, hexacopter, or an octocopter). A rotary design may be appropriate for use when a generally static hovering position facilities image or video capture, for example. Alternatively, a moving platform 18 may be configured as a fixed wing platform, such as a miniaturized airplane design or the like. Use of a fixed wing design may be appropriate, for example, when weather conditions inhibit flight and control of a rotary design. For example, a fixed wing design may exhibit better performance during high winds or rain than a rotary design. A moving platform 18 may be also configured as a combination fixed wing/rotary design or a design that can convert between fixed wing and rotary modes.

As will be discussed further in regards to FIG. 1B, a moving platform 18 may be configured with one or more communication interfaces, such as a radio transceiver and/or a wired communication interface. The communication interface(s) of a moving platform 18 may be used for wireless communication with the wireless base station 16. A wireless communication interface of a moving platform 18 may be further used for wireless communication between moving platforms 18. Additionally or alternatively, the communication interface(s) of a moving platform 18 may be used for wired communication with the intermediate system 20, including the deployment station 22.

The wireless base station 16 may comprise one or more components and/or network elements that effectuate wireless communication with a moving platform 18. The wireless base station 16 may comprise a base transceiver station (BTS). The wireless base station 16 may be considered as a gateway in some implementations. Such wireless communication may generally comprise radio-frequency (RF) communication but is not so limited. As an example, the wireless base station 16 may comprise a cellular base station to effectuate communication with one or more moving platforms 18 via a cellular network. As another example, the wireless base station 16 may comprise a wireless access point to a computer network, such as a wireless location area network (WLAN)(e.g., a Wi-Fi network) or a wireless wide area network (WAN). In some instances, a moving platform 18 may not always be within communication range of a wireless base station 16. For example, the area in which a target is located may be out of communication range of a wireless base station 16. Thus, a deployed moving platform 18 may need to move back within range of a wireless base station 16 to connect with the wireless base station 16 for communication with the central system 14. Additionally or alternatively, the deployed moving platform 18 may use another moving platform 18 as a relay to communicate via the wireless base station 16. While FIG. 1A depicts a single wireless base station 16, it is envisioned that the system 10 may include two or more wireless base stations 16.

The intermediate system 20 may comprise one or more components configured, including the deployment station 22, to effectuate a wired connection with a moving platform 18. The intermediate system 20 may comprise a server 21 or other computing device, such as to relay instructions from the central system 14, perform object recognition for captured images, or determine that a second moving platform 18 should be deployed. The intermediate system 20 may be configured with a wired communication interface via which a moving platform 18 may connect to the intermediate system 20. The wired communication interface may comprise a USB port, a universal asynchronous receiver-transmitter (UART) port, or a wired ethernet port, for example. Proprietary wired or direct physical interfaces may also be used.

The deployment station 22 may be implemented as a docking station or base for a moving platform 18. The deployment station 22 may provide a deployment and landing platform for a moving platform 18, as well as charge the battery of the moving platform 18. In use, a deployed moving platform 18 may capture information associated with a target (e.g., images, video, or sound recordings) and/or the target's surroundings and return to the intermediate system 20. There, a wired connection may be established between the moving platform 18 and the deployment station 22 for the captured information to be uploaded to the central system 14 via the intermediate system 20. Further instructions from the central system 14 may be also provided to the moving platform 18 via the wired connection with the deployment station 22.

The central system 14 may generally direct or control operations of the system 10. For example, instructions may be initially entered (e.g., by a human operator) to the central system 14 for a particular target to be tracked and observed. Mission instructions, including various mission parameters, may be entered via a graphical user interface (GUI) provided by the central system 14. The central system 14 may then provide instructions to a moving platform 18 to effectuate the tracking and observation. The central system 14 may additionally or alternatively determine if and when additional moving platforms 18 should be deployed to supplement or replace a currently deployed moving platform 18. The central system 14 may receive data captured by a deployed moving platform 18, as well as process and store such data. This may include locations of a moving platform 18 and corresponding timestamps. Additionally or alternatively, moving platform 18 locations and corresponding timestamps may be received by the central system 14 from an external source, such as a GPS system tracking the locations of a moving platform 18.

Such controls, among others, may be effectuated via the GUI provided by the central system 14. For example, an operator may interact with the GUI to cause a moving platform 18 to be deployed to fulfill a mission or to replace or support an already deployed moving platform 18. As another example, an operator may interact with the GUI to request data (e.g., captured data) from a moving platform 18. As yet another example, an operator may interact with the GUI to cause the central system 14 to transmit data to a moving platform 18, such as the results of object recognition performed by the central system 14.

The central system 14 may perform object recognition and analysis on images or video captured by a moving platform 18. For example, the central system 14 may perform facial recognition on an image to determine if a person in the image is the target person that the mission seeks to identify. The central system 14 may employ a machine-learned object recognition algorithm to determine the identities of any persons depicted in an image or video. The machine-learned object recognition algorithm may also be applied to identify inanimate objects in captured images or video.

The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide communications, such as voice, data, video, messaging, broadcast, or the like. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network, as some examples. The wireless base station 16 and/or the intermediate system 20 may be considered as part of the communication network 12 in some embodiments.

Figure 1B:
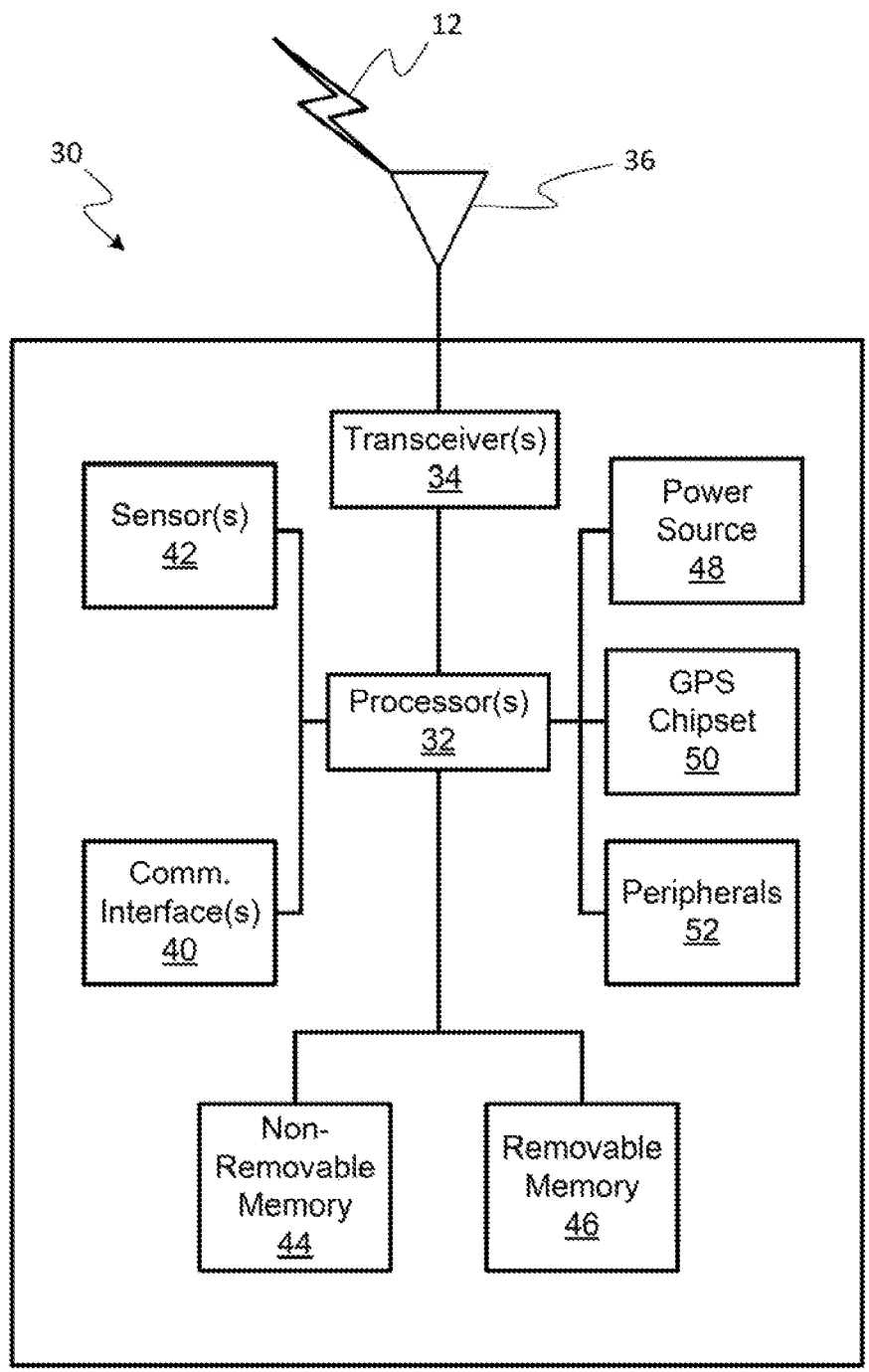
FIG. 1B illustrates a block diagram of an example moving platform according to an aspect of the application.

FIG. 1B is a block diagram of an exemplary hardware/software architecture of a moving platform 30 (e.g., a moving platform 18 of FIG. 1A). As shown in FIG. 1B, the moving platform 30 may include one or more processors 32, a communication interface 40, one or more sensors 42, non-removable memory 44, removable memory 46, a power source 48, a global positioning system (GPS) chipset 50, and other peripherals 52. The moving platform 30 may also include communication circuitry, such as one or more transceivers 34 and a transmit/receive element 36. It will be appreciated that the moving platform 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., the memory 44 and/or the memory 46) of the moving platform 30 in order to perform the various required functions of the moving platform 30. For example, the processor 32 may perform signal coding, data processing, power control, input/output processing, sensor control, flight control, and/or any other functionality that enables the moving platform 30 to operate in a directed mission. The processor 32 may run radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., the transceiver 34, the transmit/receive element 36, and the communication interface 40). The processor 32, through the execution of computer executable instructions, may control the communication circuitry in order to cause the moving platform 30 to communicate with other components of the system, such as other moving platforms, an intermediate system (e.g., the intermediate system 20 of FIG. 1A, via wired connection), or a wireless base station (e.g., the wireless base station 16 of FIG. 1A). In particular, the processor 32 may control the communication circuitry in to effectuate the techniques described herein, including locating a target person or object, tracking said target, and/or capturing data relating to said target. While FIG. 1B depicts the processor 32 and the transceiver 34 as separate components, it will be appreciated that the processor 32 and the transceiver 34 may be integrated together in an electronic package or chip.

The transmit/receive element 36 may be configured to transmit signals to or receive signals from other moving platforms or other components or systems described in relation to FIG. 1A. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals. The transceiver 34 and/or transmit/receive element 36 may be integrated with, in whole or in part, the communication interface(s) 40, particularly wherein a communication interface 40 comprises a wireless communication interface. The communication interface(s) 40 additionally or alternatively may comprise one or more wired communication interfaces.

The processor 32 may access information from, and store data in, any type of suitable memory, such as the non-removable memory 44 and/or the removable memory 46. For example, the processor 32 may store captured data (e.g., images, videos, environmental data, etc.) in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a USB drive, a secure digital (SD) memory card, and the like. In other embodiments, the processor 32 may access information from, and store data in, memory that is not physically located on the moving platform 30, such as on a remote system or other moving platform.

The processor 32 may control operation of the one or more sensors 42 of the moving platform 30 to capture data relating to an assigned mission. The one or more sensors 42 may comprise imaging sensors, including a still image camera or video camera. A camera may capture images/video in the visible frequency spectrum, the ultraviolet frequency spectrum, the infrared frequency spectrum, or any combination thereof. For example, an infrared camera may capture thermal imaging. A camera may also be configured as a night-vision camera. The one or more sensors 42 may include a sound sensor (e.g., a microphone or acoustic camera). Types of sound sensors may be defined according to sound sensitivity and/or frequency response. The one or more sensors 42 may further comprise various environmental sensors, including a wind sensor, a moisture/rain sensor, and a light level sensor. The one or more sensors 42 may also include one or more RF transceivers, such as to capture an RF signal or signature. Different moving platforms may be configured with different sensor profiles. For example, one moving platform may be configured with a high-resolution, visible light spectrum camera best suited for day use while a second moving platform may be configured with infrared and night-vision cameras suitable for night use. The processor 32 may additionally analyze data captured by the sensor(s) 42 and/or cause the moving platform 30 to transmit at least a portion of the captured data to a central system for analysis there.

The processor 32 may receive power from the power source 48, and may be configured to distribute and/or control the power to the other components in the moving platform 30. The power source 48 may be any suitable device for powering the moving platform 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like. The processor 32 may monitor the power level of the power source 48. The power level may be one factor that affects whether one or more other moving platforms are deployed to replace or assist the moving platform 30 in tracking a target or other aspect of the mission.

The processor 32 may also be coupled to the GPS chipset 50, which is configured to provide location information (e.g., longitude and latitude coordinates, as well as altitude) regarding the current location of the moving platform 30. It will be appreciated that the moving platform 30 may acquire location information by way of any suitable location-determination technique while remaining consistent with an embodiment. For example, the moving platform 30 may be connected to several wireless base stations and a triangulation technique may be used to determine the location of the moving platform 30.

Figure 1C:
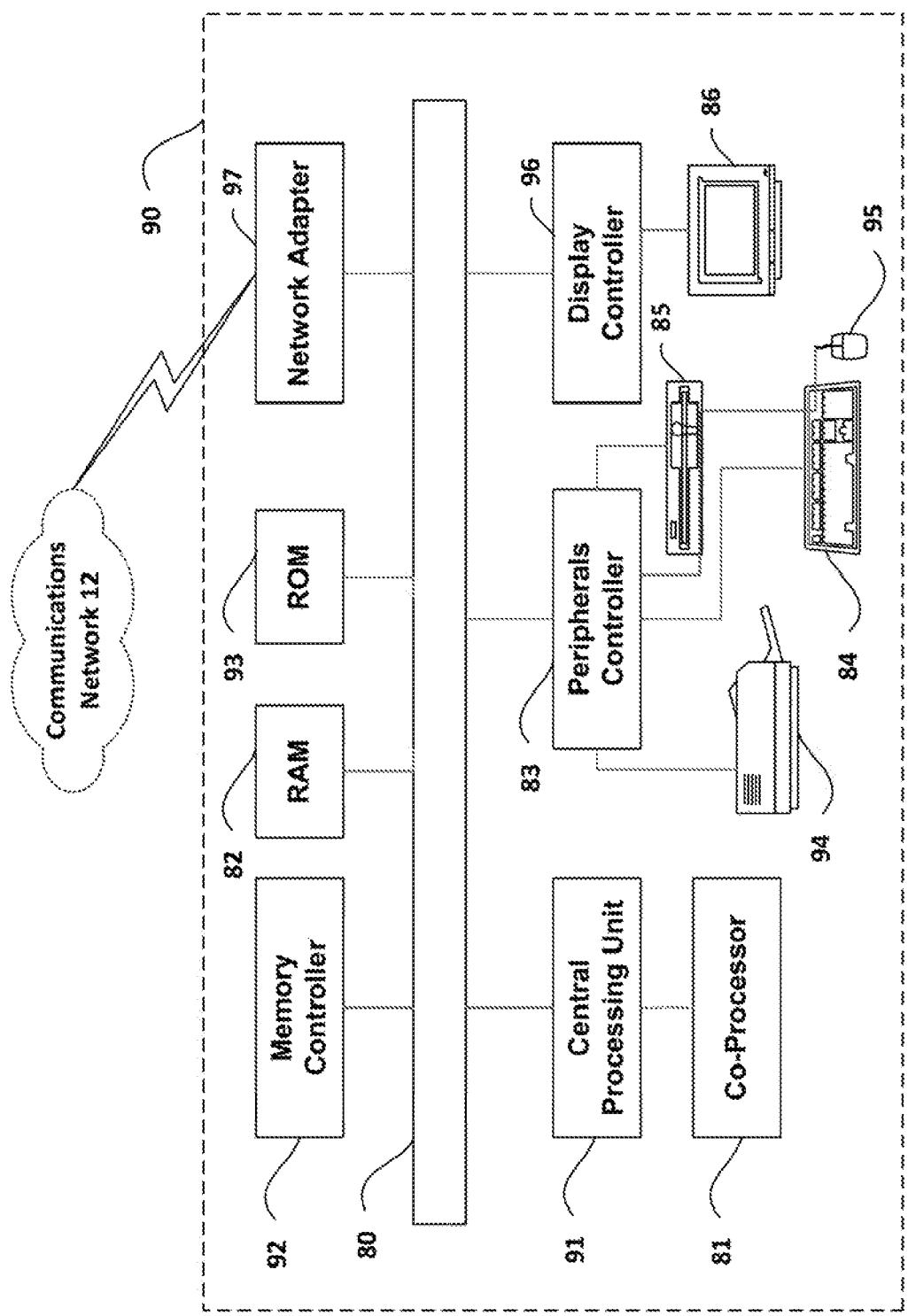
FIG. 1C illustrates a block diagram of an example computing system according to an aspect of the application.

FIG. 1C is a block diagram of an exemplary computing system 90 which may be used to implement components of the system, including an intermediate system (e.g., the intermediate system 20 and/or deployment station 22 of FIG. 1A) for wired communication, a wireless base station (e.g., the wireless base station 16), or a central system (e.g., the central system 14). Aspects of the computing system 90 may be also used to implement a moving platform (e.g., a moving platform 18 of FIG. 1A or the moving platform 30 of FIG. 1B).

The computing system 90 may comprise a computer or server and may be controlled primarily by computer readable instructions, which may be in the form of software, wherever, or by whatever means such software is stored or accessed. Such computer readable instructions may be executed within a processor, such as a central processing unit (CPU) 91, to cause the computing system 90 to do work. In many known workstations, servers, and personal computers, the central processing unit 91 is implemented by a single-chip CPU called a microprocessor. In other machines, the central processing unit 91 may comprise multiple processors. A coprocessor 81 is an optional processor, distinct from the main CPU 91 that performs additional functions or assists the CPU 91. The CPU 91 and/or the coprocessor 81 may receive data captured by a moving platform and process such data to facilitate tracking a target or other objective of a mission.

In operation, the CPU 91 fetches, decodes, executes instructions, and transfers information to and from other resources via the computer's main data-transfer path, system bus 80. Such a system bus connects the components in the computing system 90 and defines the medium for data exchange. The system bus 80 typically includes data lines for sending data, address lines for sending addresses, and control lines for sending interrupts and for operating the system bus 80. An example of such a system bus 80 may be the PCI (Peripheral Component Interconnect) bus or PCI Express (PCIe) bus.

Memories coupled to the system bus 80 include random access memory (RAM) 82 and read only memory (ROM)

93. Such memories include circuitry that allows information to be stored and retrieved. The ROMs 93 generally contain stored data that cannot easily be modified. Data stored in the RAM 82 may be read or changed by the CPU 91 or other hardware devices. Access to the RAM 82 and/or the ROM 93 may be controlled by the controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, the computing system 90 may comprise a peripherals controller 83 responsible for communicating instructions from the CPU 91 to peripherals, such as a printer 94, a keyboard 84, a mouse 95, and a disk drive 85. A display 86, which is controlled by a display controller 96, is used to display visual output generated by the computing system 90. Such visual output may include text, graphics, animated graphics, and video. Visual output may further comprise a GUI, such as the GUI 300 in FIG. 3, configured to effectuate various operations of the system 10. The display 86 may be implemented with a CRT-based video display, an LCD-based flat-panel display, gas plasma-based flat-panel display, or a touch-panel. The display controller 96 includes electronic components required to generate a video signal that is sent to the display 86.

Further, the computing system 90 may comprise communication circuitry, such as a network adaptor 97, that may be used to connect the computing system 90 to an external communications network, such as the communication network 12 of FIGS. 1A-C, to enable the computing system 90 to communicate with other components of the system and network.

Figure 2:
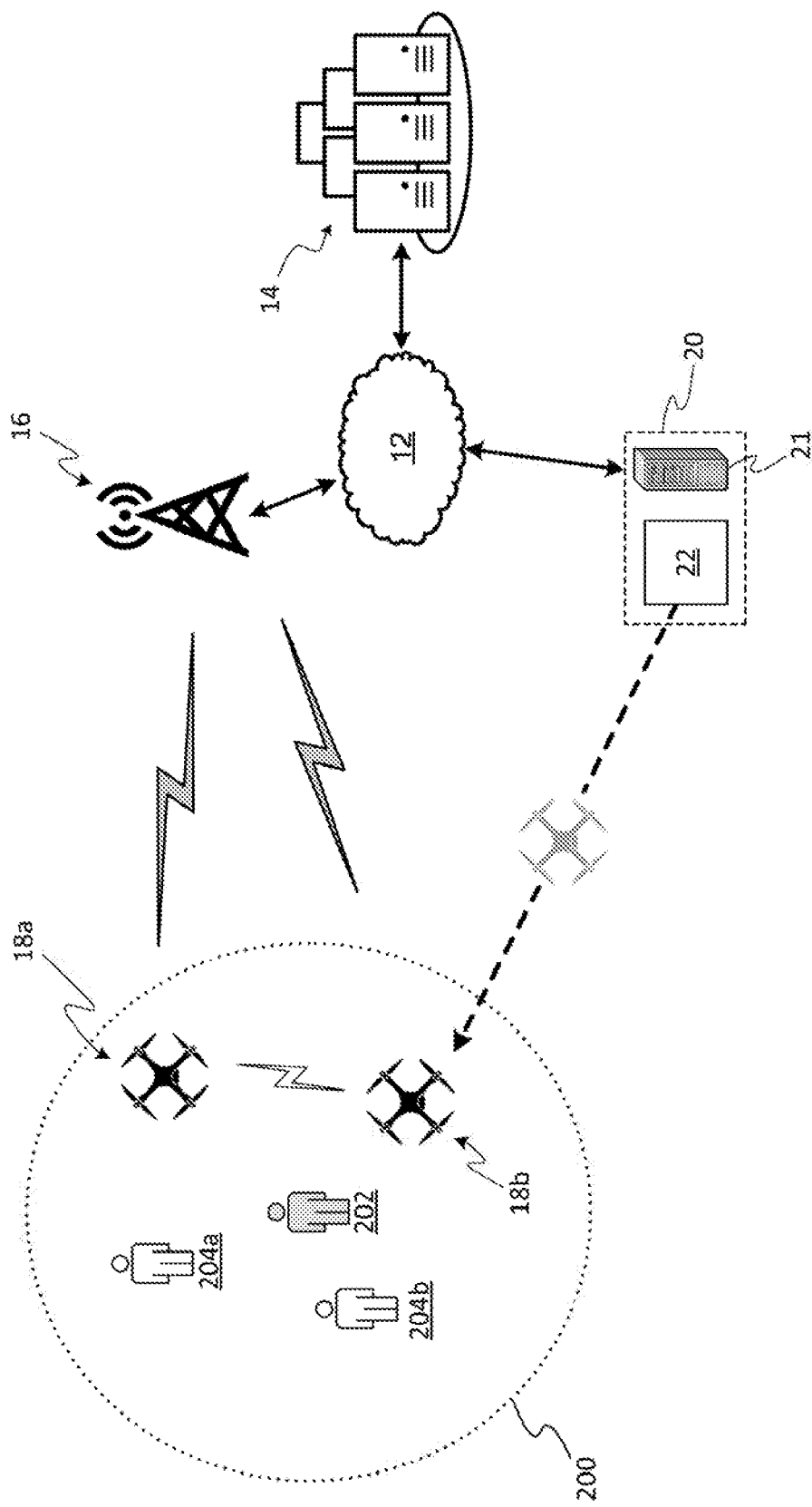
FIG. 2 illustrates a diagram of an example operation, according to an aspect of the application, within the system of FIG. 1A.

FIG. 2 illustrates an example operation within the system 10 according to at least some aspects of the disclosure. Initially, a first moving platform 18a is deployed to a first area 200 associated with a target (e.g., a target person 202). The first moving platform 18a may be deployed based on one or more instructions. The instructions may task the first moving platform 18a to locate the target person 202, determine the identity of the target person 202, determine objects (e.g., person 204a and/or person 204b) and/or activities associated with the target person 202, provide cellular service to the target person 202, or any combination thereof. Although not depicted in FIG. 2, the first moving platform 18a may have been deployed from the deployment station 22. In some aspects, the target person 202 may be instead a target inanimate object, such as a vehicle or lost pet. Additionally or alternatively, in some aspects, the one or more of the persons 204a, 204b may be instead an inanimate object, such as a vehicle or drug package.

The first moving platform 18a, at the first area 200, may attempt to perform the task(s) indicated in the instructions. The first moving platform 18a may attempt to perform the tasks using one or more sensors of the first moving platform 18a, such as a visible light camera. The first moving platform 18a, however, may be unable to perform the task(s) using its equipped sensors, such as being unable to capture adequate images of the target person 202 or associated persons 204a, 204b. Additionally or alternatively, environmental variables at the first area 200, such as high wind speed, may hinder or prevent the first moving platform 18a from completing its tasks. Additionally or alternatively, the first moving platform 18a may have low battery power. The first moving platform 18a may wirelessly communicate, via the wireless base station 16, the status of its attempts to perform the assigned task(s) to the central system 14. The first moving platform 18a may further communicate, via the wireless base station 16, captured data (e.g., captured images) to the central system 14 for processing. The first moving platform 18a may yet further communicate its location and a current time to the central system 14.

Due to an inability or inadequacy of the first moving platform 18a to complete its assigned tasks, a second moving platform 18b is deployed (indicated by dotted arrow) from the deployment station 22 to the first area 200 to replace or supplement the first moving platform 18a at the first area 200. Deployment of the second moving platform 18b may be determined by the intermediate system 20 or the central system 14. The second moving platform 18b may have a different configuration than the first moving platform 18a, such as with respect to sensors, flight capabilities, communication capabilities, or battery power. For example, the second moving platform 18b may be configured with a night-vision camera to compensate for the inadequate visible light daytime camera of the first moving platform 18a.

The first moving platform 18a may communicate wirelessly with the second moving platform 18b upon the second moving platform's 18b arrival at the first area 200. For example, the first moving platform 18a may communicate its status in performing the assigned tasks, as well as any data captured by the first moving platform 18a. For example, the first moving platform 18a may communicate to the second moving platform 18b the first moving platform's 18a battery power level, the remaining flight time of the first moving platform 18a given said battery power level, any preliminary estimated locations of the target person 202, any preliminary estimated identities of the target person 202, any preliminary estimated identities of the associated persons 204a, 204b, the sensor profile of the first moving platform 18a, the location of the first moving platform 18a, and/or any environmental variables at the first area 200. The first moving platform 18a may remain at the first area 200 or may return to the deployment station 22, such as to upload captured data via a wired connection with the deployment station 22.

At the first area 200, the second moving platform 18b may thereby perform, at least in part, the tasks indicated in the initial instructions. For example, the second moving platform 18b may capture night-vision images of the target person 202 or persons 204a, 204b associated with the target person 202. Such captured data may be transmitted, such as via the wireless base station 16, to the central system 14 for processing. Additionally or alternatively, the second moving platform 18b may return to the deployment station 22 and upload the captured data via the wired connection with the deployment station 22. The data captured by the second moving platform 18b may be used to complete the assigned task, such as locating the target person 202, determining an object and/or activity associated with the target person 202, determining the identity of the target person 202, and/or providing cellular service to the target person 202. Machine learning algorithms may be used to facilitate various aspects of these techniques, including object recognition, target locating, target tracking, and RF communication. Such machine learning algorithms may include a convolutional neural network (CNN) or other types of neural networks.

Figure 3:
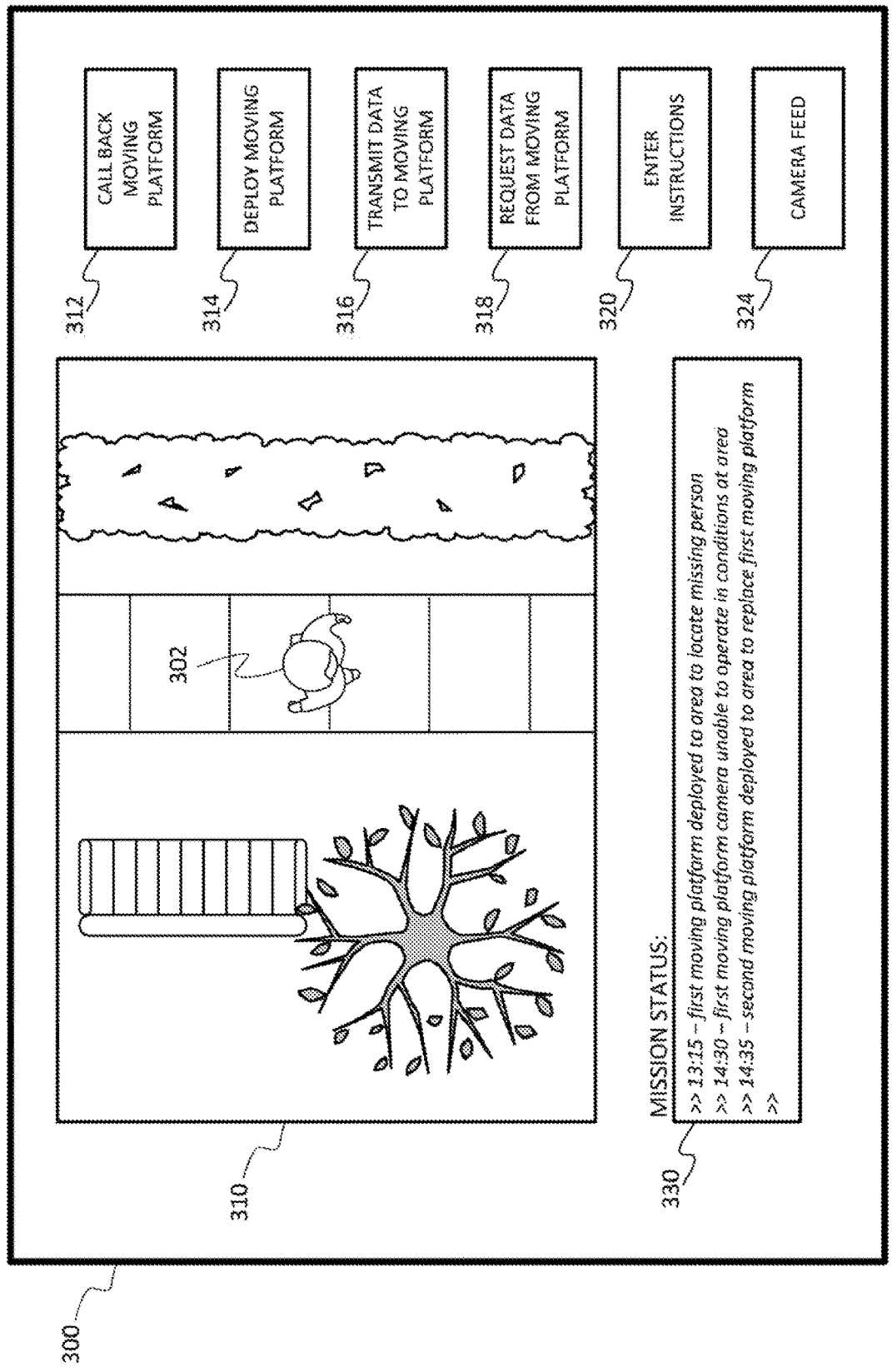
FIG. 3 illustrates an example graphical user interface according to an aspect of the application.

FIG. 3 illustrates an example graphical user interface (GUI) 300 that may be used in conjunction with techniques disclosed herein. The GUI 300 may be generally used to initiate and/or direct various operations of the system 10 of FIG. 1A. For example, the GUI 300 may be used to direct a moving platform (e.g., the moving platform(s) 18 of FIGS. 1A and 2) to an area to effectuate a mission, such as locating a missing person. As another example, the GUI 300 may be used to receive updates on the status of the mission, as well as cause data exchanges between a deployed moving platform and a control system, such as a central system. As another example, the GUI 300 may be used to deploy a second moving platform to the area if the initial moving platform is unsuccessful in accomplishing its mission or requires support from the second moving platform. The GUI 300 may be implemented at a central system (e.g., the central system 14 of FIG. 1A). The GUI 300 may be used by operators at the central system or the GUI 300 may be accessed by operators remotely, such as via a webpage.

The GUI 300 comprises a display area 310, a mission status area 330, and a plurality of interactive interface elements 312-324. Activation of any of the interface elements 312-324 may cause a pop-up window to be displayed, via which various parameters relating to that interface element may be entered by an operator.

The display area 310 may be configured to display various data captured by one or more deployed moving platforms. For example, the display area 310 shown in FIG. 3 depicts a bird's eye image or video captured by a deployed moving platform at an area. The image or video in the display area 310 depicts various objects at the area, including a person 302. The person 302 may be a target person that a mission seeks to locate or identify, for example. Object recognition may be performed on the image or video depicted in the display area 310 to identify or attempt to identify, for example, the person 302. As object recognition is performed on the image or video, the object recognition process itself may be depicted in the display area 310. The display area 310 may be also used to show thermal images or acoustic or RF signatures (e.g., waveforms) captured by a moving platform.

The interface element 320 is configured to, upon activation, enable an operator to input instructions (e.g., via a further pop-up window) to initiate a mission involving one or more moving platforms. The interface element 320, upon activation, may further enable an operator to input various parameters relating to said mission, such as the type of mission, a target of the mission, and an area associated with the target.

The interface element 314 is configured to, upon activation, cause a moving platform to be deployed, such as from a deployment station. The interface element 314, upon activation, may further enable an operator to input various parameters relating to deployment of a moving platform, such as an identifier of the moving platform to be deployed and an area to which the moving platform is to be deployed.

The interface element 312 is configured to, upon activation, cause a deployed moving platform to return from the area to which the moving platform was deployed. That is, activation of the interface element 312 causes the deployed moving platform to be "called back." The moving platform may be directed to return to a deployment station, such as to recharge and/or upload any data captured by the moving platform. The interface element 312, upon activation, may enable an operator to input various parameters relating to calling back a deployed moving platform, such as an identifier of the moving platform and a deployment station to which the moving platform is to return.

The interface element 318 is configured to, upon activation, request data from a deployed moving platform. For example, the interface element 318, upon activation, causes one or more deployed moving platforms to transmit data to a receiving system, such as the central system. For example, a wireless signal may be sent to a deployed moving platform indicating that the moving platform is to transmit (e.g., wirelessly) data to the central station. Examples of such data may include data captured by the moving platform (e.g., images, RF data, or sound samples), the position of the moving platform and corresponding timestamp, or environmental conditions at the area (e.g., wind speed, precipitation, or light level). The interface element 318, upon activation, may enable an operator to input various parameters relating to requesting data from a deployed moving platform, such as the moving platform identifier and the requested data or type of data.

The interface element 316 is configured to, upon activation, cause transmission of data to one or more deployed moving platforms. The data may be transmitted from the central station to the deployed moving platform, for example. The transmission may be wireless. The transmitted data may comprise data that the central station received from other moving platforms (and subsequently stored), such as the other moving platform's position, data captured by the other moving platform, or the status of various aspects of the other moving platform (e.g., sensor profile, power profile, communication profile, or flight profile). The interface element 316, upon activation, may enable an operator to input various parameters relating to transmitting data to one or more deployed moving platform, such as the identifier of the deployed moving platform to which data is to be sent and the data or type of data to send to the deployed moving platform. The interface element 318 and the interface element 316 may be used in conjunction with one another to effect a data exchange between two deployed moving platforms. For example, an operator may activate the interface element 318 to request data from a deployed moving platform. The central station may subsequently receive the requested data. The operator may activate the interface element 316 to cause that received data to be transmitted to another deployed moving platform.

The interface element 324 is configured to, upon activation, cause images or video captured by a deployed moving platform to be shown in the display area 310. The images or video may be live images or video or recorded, past images or video. The interface element 324, upon activation, may enable an operator to input various parameters relating to the display of captured images or video in the display area 310, such as an identifier of the moving platform whose captured images or video is to be shown in the display area 310 and the particular sensor or type or sensor that the moving platform is to use to capture said images or video. For example, an operator may indicate whether the display area 310 is to show thermal images from a thermal camera of a moving platform or the conventional images from a visible light camera of the moving platform.

The mission status area 330 is configured to display updates to one or more ongoing missions. The mission updates within the mission status area 330 are shown in FIG. 3 as scrolling text updates, but the application is not so limited. As examples, the mission status area 330 may indicate that: a mission has been initiated (and various parameters of the mission), a moving platform has been deployed for the mission, an intermediate step of the mission has been accomplished (e.g., locating a target but not yet determining an identity), the first moving platform is unable to perform the mission, a second moving platform has been deployed to replace/supplement the first moving platform, and the mission has been accomplished. Activation of any of the interface elements 312-324 may be also indicated in the mission status area 330.

Figure 4:
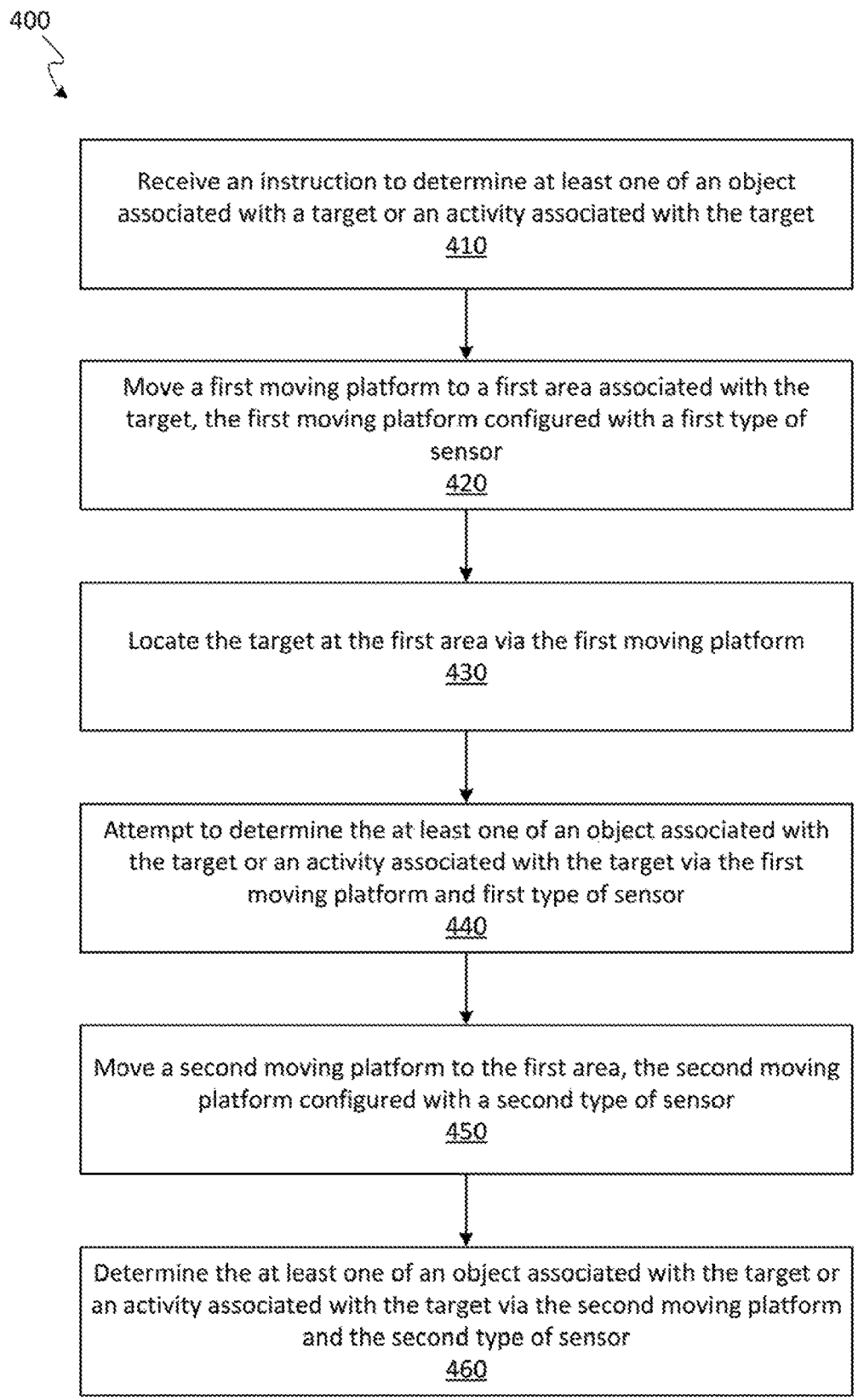
FIG. 4 illustrates a method flowchart according to an aspect of the application.

FIG. 4 illustrates a method 400 for determining an object associated with a target and/or an activity associated with the target using one or more moving platforms, such as the moving platform(s) 18 of FIGS. 1A and 2. For example, the method 400 may be implemented to surveil a target person (e.g., a person of interest) using one or more moving platforms and determine those individuals with whom the target person associates and/or determine the activities that the target person engages in. The method may be further implemented to determine a pattern of life of the target person. The target person may be typically a person whose identity is known. For example, a target person may be a criminal suspect, a person wanted by the police (e.g., a person with a warrant for his or her arrest), or a spouse subject to (or expected to be subject to) a divorce proceeding. A second moving platform may be deployed to replace or assist an initially deployed first moving platform, such as if the first moving platform is unable to adequately perform its designated task.

At step 410, an instruction is received to determine, using one or more moving platforms, at least one or more of an object associated with a target or an activity associated with the target. The target may be a target person. The instruction may be received via a central system, such as the central system 14 of FIG. 1A. For example, an operator may enter the instruction into the central system via a graphical user interface, such as the GUI 300 of FIG. 3. The operator may activate the interface element 320 of the GUI 300 to enter the instruction. The instruction may be provided by a law enforcement agency to track a target person and determine objects and/or activities associated with the target person. A law enforcement agency may provide the instruction in order to gather evidence for a criminal investigation of the target person, as well as to possibly determine other persons that may be involved in a same criminal endeavor as the target person.

An object associated with the target person may comprise a person that interacts with the target person and/or a person located proximate the target person. For example, a person associated with the target person may comprise a person with whom the target person converses, embraces, shakes hands (or otherwise makes physical contact), or performs a business transaction (legal or illicit). A person associated with the target person may be a person proximate the target person. Such proximity may be measured by a premises or property boundary in which the target person is located. Such proximity may be additionally or alternatively measured according to a prescribed distance from the target person. For example, a person may be considered proximate the target person if the person is within 20 feet of the target person.

Additionally or alternatively, an object associated with the target person may comprise an inanimate object. For example, an object may comprise a vehicle, such as a vehicle operated by the target person. An object may comprise a license plate of a vehicle. As another example, an object may comprise a weapon, such as a firearm. As yet another example, an object may comprise a package or container of an illegal substance, such as an illegal drug.

An activity associated with the target person may comprise a business transaction (e.g., a drug deal) or a physical activity with another person (e.g., a romantic physical encounter), as examples. An activity associated with the target person may comprise a pattern of life of the target person. A pattern of life of the target person may reflect multiple activities engaged in by the target at various times. For example, a pattern of life may indicate a typical travel route (e.g., a commute route to work or school) of the target or one or more locations that the target person frequents. A pattern of life may indicate various timing aspects of the target person's activities, such as the typical time of day that the target person travels or the typical time of day that the target person leaves his or her residence. A pattern of life may comprise a first activity during a first time period and a second activity during a later second time period. The first and second activities may be the same or different types of activities. The first and second activities may occur at the same or different locations.

The instruction may comprise data according to which the target person may be identified. For example, the instruction may comprise a digital facial profile of the target person, such as an image of the target person's face or, indeed, a whole-body image of the target person. As another example, the instruction may comprise data indicating a cell phone of the target person, such as an RF signature associated with the cell phone.

The instruction may indicate that the one or more moving platforms should capture the target person from as many angles (horizontal, vertical, or a combination thereof) as possible (e.g., at least a minimum number of angles). An angle may be defined according to a pre-determined number of degrees, such as 15 degrees, 30 degrees, or 45 degrees. An angle may be with respect to the target person, object, or activity.

At step 420, a first moving platform is moved (e.g., caused to be moved) to a first area associated with the target (e.g., target person). As an example, the first moving platform may be moved to the first area in response to an input to a graphical user interface associated with the central system, such as activation of the interface element 314 of the GUI 300. The first moving platform is configured with at least a first type of sensor. The first moving platform may be initially moved from a deployment zone, i.e., a second area. For example, the second area may be deployed from the deployment station 22 of FIG. 1A. The first moving platform may be moved to the first area associated with the target person based on the instruction to determine an object and/or activity associated with the target person. At least a portion of the instruction may be provided to (e.g., uploaded to) the first moving platform via the intermediate or central system, including via the deployment station. The instruction may indicate the first area.

The first area associated with the target person may be an area at which the target person is located or is expected to be located, such as the target person's residence. The first area may be defined based on a geographical point of reference, such as an address, premises, or property boundary. The first area may be defined as the area within a pre-determined distance from such a point of reference, such as the area within 50 or 100 feet, for example, of the target person's residence. The first area may be defined by one or more geographical coordinates, such as global positioning system (GPS) coordinates. For example, a GPS coordinate may define the above-referenced single geographical point of reference or several GPS coordinates may define the bounds of the first area.

As indicated above, the first moving platform is configured with at least a first type of sensor. The first moving platform may be additionally or alternatively configured with several types of sensors, which may be referred to as a sensor profile of the first moving platform. The first type of sensor may comprise any of the types of sensors described in relation to the one or more sensors 42 of FIG. 1B. For example, the first type of sensor may comprise a visible-light camera, an infrared camera, a night vision camera, a thermal imaging camera, an RF sensor, or a microphone.

The first moving platform may be also configured according to a power supply configuration (a power profile), such as a maximum battery capacity, a remaining battery power level, a maximum flight time (e.g., based on the maximum battery capacity), or a remaining flight time (e.g., based on the remaining battery power level). A power profile may also relate to a moving platform's capabilities to execute in-flight power transfer with another moving platform. The first moving platform may be also configured according to various flight capabilities (a flight profile) with respect to, for example, flight distance, flight time, maximum or minimum flight altitude, flight speed, night (low light) flight capability, and design (e.g., fixed wing or rotary). The first moving platform may be also configured according to communication capabilities (a communication profile), such as with respect to communication medium (e.g., cellular, satellite, or wireless communication in general) or wireless communication range. Communication capabilities may also include the capability of the first moving platform to function as a wireless base station to effectuate communication between a target person (e.g., the target person's mobile device) and a cellular network, specifically a stationary wireless base station connected to said cellular network.

At step 430, the target (e.g., target person) is located, via the first moving platform, at the first area. The target may be located via the first type of sensor and/or other types of sensors of the first moving platform. Locating the target person may be performed using a facial recognition algorithm on an image of the target person. For example, locating the target person may comprise capturing an image of a person at the first area and identifying the person in the image as the target person. This may comprise capturing images of numerous persons at the first area and subjecting each image to a facial recognition algorithm until the target person is identified in an image.

Locating the target person at the first area may be performed at least in part by the first moving platform, such as by a processor onboard the first moving platform. For example, the processor onboard the first moving platform may perform image recognition to identify the target person at the first area. Additionally or alternatively, locating the target person at the first area may be performed, at least in part, by another computing device or system, such as the intermediate or central system. In this case, the first moving platform may transmit one or more images captured by the first moving platform to the intermediate or central system. The intermediate or central system may subject the one or more images to a facial recognition algorithm to identify the target person at the first area. The intermediate or central system may transmit data identifying the target person in the images back to the first moving platform. The precise location (e.g., geographical longitude and latitude coordinates) of the target person and/or the time(s) that the images of the target person were captured may be recorded, such as for reference when deploying another moving platform. Further data regarding the target person recognized in the images may be also recorded and/or transmitted back to the first moving platform, such as the size, shape, and color of the target person.

In some embodiments, if the first moving platform proves insufficient to locate the target person at the first area, a replacement or supplemental moving platform may be deployed to the first area. This other moving platform may be equipped with a different sensor profile than that of the first moving platform. For example, the images captured by the first moving platform may be inadequate to identify the target person in the images. The other moving platform may be configured with a more powerful camera, a camera with a higher resolution, and/or a camera more suitable for present conditions to capture one or more images of the suspected target person. Additionally or alternatively, this other moving platform may be configured with a different, more suitable power supply profile, flight profile, and/or communication profile than that of the first moving platform. A machine learning algorithm may be used to locate the target person at the first area.

Once the target person is located, the first moving platform may track the target person. For example, it may be necessary that the first moving platform track the movements of the target person. This may entail moving to another area as the target person moves outside of the original first area. If the first moving platform is unable to adequately track the target person, another moving platform may be deployed to assist or replace the first moving platform. Geographical locations (e.g., GPS coordinates) of the moving first moving platform and the moving target person may be intermittently transmitted to the intermediate or central system, such as to enable another moving platform to take over tracking the target person for the first moving platform.

At step 440, an attempt is made to determine, via the first moving platform and its first type of sensor, the at least one of an object associated with the target (e.g., target person) or an activity associated with the target. For example, the attempt to determine the object and/or activity associated with the target person may be performed, at least in part, by the first moving platform. Additionally or alternatively, the attempt may be performed, at least in part, by the intermediate or central system.

Attempting to determine the object and/or activity associated with the target person may comprise capturing (or attempting to capture) one or more images of a suspected object and/or activity associated with the target person using the first type of sensor (e.g., a first type of camera or other imaging sensor). The one or more images may be from different angles, such as the result of the first moving platform circling the suspect object and/or activity. The one or more images may be organized as still images or may form a video sequence. As noted above, an object associated with the target person may be another person or an inanimate object. After capturing one or more images of the suspect object or activity, object recognition (e.g., facial recognition) may be performed on the one or more images to attempt to determine the object and/or activity associated with the target person. The object recognition may be performed according to a machine learning algorithm.

Performing object recognition may comprise comparing any recognized objects from the one or more images with objects with known identities. For example, a face recognized in the one or more images may be compared against a database of faces of known individuals to determine the identity of a person recognized in the one or more images. A similar process may be performed with respect to an inanimate object. For example, a license plate number of a suspect vehicle may be recognized in the one or more images. The license plate number may be cross-referenced with a database of known license plates and their respective registered individual(s) to attempt to determine the object and/or activity associated with the target person. Object recognition may be also performed to identify any activity associated with the target person. For example, an image of the target person reaching out and exchanging an item (e.g., a package of drugs or other illegal item) with another person may be recognized in the one or more images.

Attempting to determine the object and/or activity associated with the target person may comprise analyzing sound data captured by a microphone of the first moving platform. The sound data may comprise a sound recording of a suspect object, such as a sound recording of a suspect person's speech. The sound data may comprise an acoustic signature associated with the suspect object and/or activity, as another example. In an attempt to determine the object and/or activity associated with the target person, the sound recording or acoustic signature may be compared to a database of sound recordings or acoustic signatures associated with known persons or other objects.

The object recognition may be performed by the first moving platform or the first moving platform may transmit the one or more images back to the intermediate or central system for object recognition to be performed there. An operator may indicate that the one or more images (and/or other data) be sent back to the central station via a GUI. For example, an operator may activate the interface element 318 of the GUI 300 to cause the first moving platform to send the captured images and other data back to the central station. The object recognition results from the intermediate or central system may be transmitted back to the first moving platform. An operator may indicate that the object recognition results be sent to the first moving platform via a GUI. For example, an operator may activate the interface element 316 of the GUI 300 to cause the central station to send the object recognition results to the first moving platform. Conversely, object recognition results from the first moving platform may be transmitted back to the intermediate or central system. Sound analysis may be similarly performed by the first moving platform and/or the intermediate or central system (or combination thereof).

Attempting to determine the object or activity associated with the target person may comprise an iterative process of subsequent attempts. For example, multiple images and/or multiple objects represented in images may be subject to object recognition. If a first image or object within an image is unable to be determined as an object or activity associated with the target person, further images and/or objects within images may be subsequently subject to object recognition to attempt to determine the object or activity associated with the target person. The multiple images may comprise images captured from multiple angles.

At step 450, a second moving platform is moved (e.g., cause to be moved) to the first area based on the attempting, via the first moving platform and its first type of sensor, to determine the object or activity associated with the target person. As an example, the second moving platform may be moved to the first area in response to an input to a graphical user interface associated with the central system, such as activation of the interface element 314 of the GUI 300. The second moving platform is configured with a second type of sensor that is different from the first type of sensor used by the first moving platform to attempt to determine the object or activity associated with the target person. The second moving platform may have a different sensor profile than the first moving platform. The second moving platform is generally moved to the first area to replace or assist the first moving platform in determining the object or activity associated with the target person. A determination to move the second moving platform to the first area may be performed using a machine learning algorithm. A determination to move the first moving platform away from the first area (e.g., back to a deployment station) may be also performed using a machine learning algorithm.

The second moving platform may be moved to the first area based on a failure to determine the object or activity associated with the target person via the first moving platform. The second moving platform may be moved to the first area based on an inadequacy, although not failure per se, of the first moving platform to determine or facilitate determination of the object or activity associated with the target person. For example, the object or activity may be determined but at an unacceptable confidence level (e.g., below a confidence threshold). The second moving platform may be moved to the first area to supplemental the capabilities of the first moving platform even if the first moving platform is sufficiently able to determine or facilitate determination of the object or activity associated with the target person. Moving the second moving platform to the first area may be initiated by the first moving platform and/or the intermediate or central system. For example, the first moving platform and/or the intermediate or central system may determine that attempts to determine the object or activity have failed and thus cause the second moving platform to move to the first area. An operator may activate an interface element of a graphical user interface to determine the status of the first moving platform's attempts. For example, an operator may activate the interface element 318 of the GUI 300 to request data from the first moving platform indicating the status of the first moving platform's attempts.

The first moving platform may be unable or inadequate to determine or facilitate determination of the object or activity associated with the target person due to the sensor profile of the first moving platform. For example, the first sensor type of the first moving platform may be unable or inadequate to determine or facilitate determination of the object or activity. As an example, the first type of sensor may be a wide-angle camera unsuitable for capturing close-up images of a suspect object or activity and such close-up images are needed or useful to determine the object or activity associated with the target person. The second type of sensor of the second moving platform may be a camera having a telephoto lens well suited to taking clear close-up images. As another example, the first moving platform maybe configured for night operation and has only a night-vision camera, a thermal imaging camera, and a low-resolution visible light camera. Consequently, the first moving platform may be unable to capture daytime images with sufficient quality to determine the object or activity. Thus, the second type of sensor of the second moving platform may comprise a high-resolution visible light camera configured for daytime operations.

Attempts to determine the object or activity associated with the target person may be hindered or prevented by environmental factors, such as wind speed, precipitation, or light level. The second moving platform may be deployed to compensate for one or more of said environmental factors. For example, if the first moving platform is configured with only a visible light camera, the onset of twilight or nighttime may inhibit attempts to determine the object or activity associated with the target person. Thus, the second type of sensor may comprise a night-vision camera or an infrared thermal imaging camera. As another example, due to high wind speeds at the first area that interfere with the first moving platform's flight performance, the second moving platform may be configured with a fixed wing design that is less affected by high wind speeds.

Attempts to determine the object or activity associated with the target person may be additionally or alternatively hindered or prevented by the power profile, flight profile, and/or communication profile of the first moving platform. For example, the first moving platform may have insufficient battery power to continue to monitor the first area. Thus, the second moving platform may be deployed having a fully charged battery. As another example, the first moving platform may be configured with a fixed wing design and is unable to capture a sustained, single perspective video of the target person and associated objects and/or activities. Thus, the second moving platform may be configured with a rotary design suitable for capturing video from a single perspective. As yet another example, the first moving platform at the first area may be unable to communicate with a wireless base station to transmit captured images and other data back to the intermediate or central system. Thus, the second moving platform may be configured with a more powerful transceiver that is able to communicate with the wireless base station.

In some instances, the target person or object or activity associated with the target person may move to a second area. As such, it may be required that the second moving platform track the target person or object associated with the target person to the second area. In other instances, the target person or object associated with the target person may have already moved to the second area. The first moving platform may have tracked the target person or object to the second area. In this case, the second moving platform may move to the second area to "meet" the first moving platform and take over or replace the first moving platform at the second area.

The method is not limited to moving only a second moving platform to replace or assist the first moving platform. Rather, a third, fourth, etc. moving platform may be deployed in addition to the second moving platform. Similarly, multiple moving platforms may be already deployed to the first area and engaged in attempting to determine the object or activity associated with the target person. Additional moving platforms may be deployed to assist or replace one or more of the multiple moving platforms already at the first area.

At step 460, the at least one of an object associated with the target (e.g., target person) or an activity associated with the target is determined via the second moving platform and the second type of sensor. For example, the object or activity associated with the target person may be determined using a thermal imaging camera of the second moving platform that was provided to take over the image capture functionality of an inadequate visible light camera of the first moving platform. The images captured by the thermal image camera may be used to determine the object or activity.

Determining the object and/or activity associated with target person may be performed, at least in part, by the second moving platform. Additionally or alternatively, determining the object or activity associated with the target person may be performed, at least in part, by the intermediate or central system. The second moving platform may move back to the intermediate or central system to upload captured data for the intermediate or central system to determine the object or activity. Additionally or alternatively, the second moving platform may transmit captured data via a wireless base station to the intermediate or central system for the intermediate or central system to determine the object or activity. An operator may use a graphical user interface associated with the central station to request data (e.g., captured images) from the second moving platform. For example, the interface element 318 of the GUI 300 may be activated to request (and subsequently receive) captured data from the second moving platform.

Determining the object or activity associated with the target person via the second moving platform using the second type of sensor may be performed using techniques similar, in at least some aspects, with the attempting to determine the object or activity via the first moving platform using the first type of sensor of step 440. For example, determining the object or activity via the second moving platform using the second type of sensor may be performing using object recognition (e.g., facial recognition or license plate recognition). The object recognition may be performed on one or more images captured by the second type of sensor (e.g., a still image camera or video camera).

Determining the object or activity may comprise tracking the object or activity to a second area to which the target person or object or activity moved. Determining the object or activity may comprise moving the second moving platform to a different position at the first area than that of the first moving platform. The position may be with respect to latitude and longitude or altitude. Determining the object or activity may comprise capturing data using the second type of sensor from multiple angles of the object or activity, such as may be accomplished by circling the object or activity or the target person him- or herself. Determining the object or activity associated with the target person may comprise using a machine learning algorithm.

Figure 5:
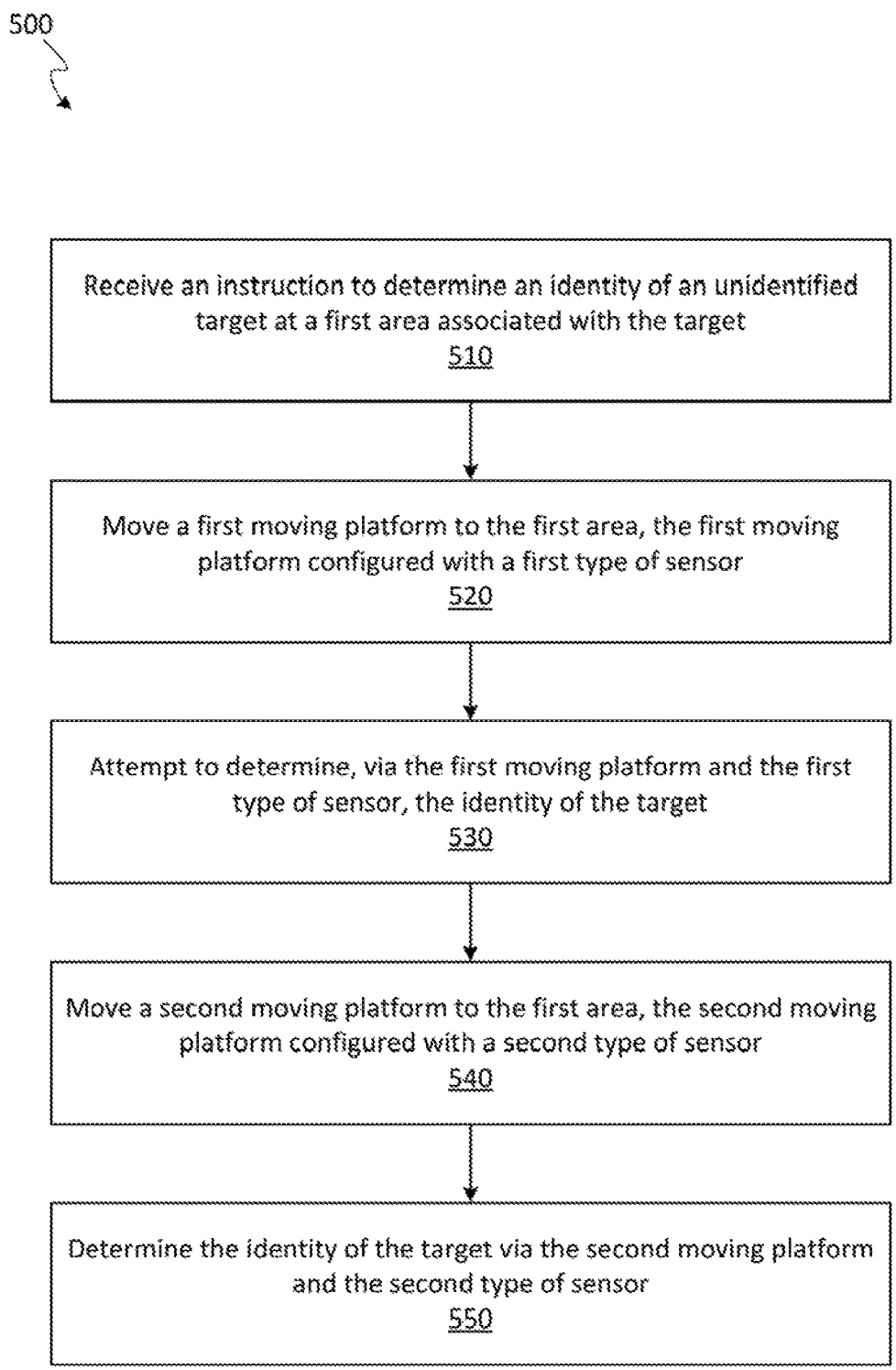
FIG. 5 illustrates a method flowchart according to an aspect of the application.

FIG. 5 illustrates a method 500 for determining an identity of an unidentified target (e.g., a target person or target inanimate object) using one or more moving platforms, such as the moving platform(s) 18 of FIGS. 1A and 2. For example, the method 500 may be implemented to determine the identity of an unknown person in the process of or following a criminal activity. The unknown person may be in flight from a crime location, such as a robbed bank, for example. As such, the method 500 may be initiated by a law enforcement agency to gather evidence or to assist in apprehending the person. If a first moving platform initially deployed to determine the identity of the target proves unable or inadequate to determine the identity, a second moving platform may be deployed to replace or supplement the first moving platform. The second moving platform may have a different configuration that better allows the target person to be identified. One benefit realized by the method 500 and other techniques described herein is that risk to the target, law enforcement, and any bystanders is minimized since law enforcement may deploy the moving platforms according to the method 500 and other described techniques rather than engaging in vehicular or on-foot pursuit of the target.

At step 510, an instruction is received to determine, via one or more moving platforms, an identity of an unidentified target at a first area associated with the target. The target may be a target person. In some aspects, the target may be an inanimate object, such as a vehicle. In other aspects, the target may transition from a person to a vehicle, such as if the person is initially tracked but then enters and drives a vehicle. In yet other aspects, the target may be a target cellular phone or other mobile communication device, such that the target device's RF signal and/or signature may be tracked. The instruction may be received via an intermediate or central system (e.g., the intermediate system 20 or the central system 14 of FIG. 1A). For example, an operator may enter the instruction into the central system via a graphical user interface, such as the GUI 300 of FIG. 3. The operator may activate the interface element 320 of the GUI 300 to enter the instruction. The instruction may indicate an area associated with the target person (e.g., the first area), such as the location of a crime in progress. The instruction may indicate that the one or more moving platforms should capture images or other data from as many angles as possible to facilitate facial recognition. For example, the instruction may indicate a minimum number of angles.

At step 520, a first moving platform is moved (e.g., caused to be moved) to the first area associated with the target (e.g., the target person) based on the instruction. As an example, the first moving platform may be moved to the first area in response to an input to a graphical user interface associated with the central system, such as activation of the interface element 314 of the GUI 300. The first moving platform is configured with at least a first type of sensor. The first moving platform may receive the instruction via a deployment station, such as the deployment station 22 of FIG. 1A. Additionally or alternatively, the first moving platform may receive the instruction wirelessly. The first moving platform may be initially moved from the deployment station. The first area may be defined by an address or property boundary. Additionally or alternatively, the first area may be defined according to a pre-determined distance from a geographic point of reference, such as an address or set of geographical coordinates.

As indicated above, the first moving platform is configured with at least a first type of sensor, which may define, at least in part, a sensor profile of the first moving platform. The first sensor type may comprise a visible light (daytime) camera, a night-vision camera, an infrared camera, a thermal imaging camera, a microphone, or an RF sensor. The first moving platform may be configured according to a power (e.g., battery) profile, a communication profile, and a flight profile.

In some aspects, additional moving platforms may be moved to the first area along with the first moving platform. Each of these moving platforms may be configured with the same or similar profiles (e.g., with respect to sensor, flight, communication, or power profiles). In some cases, at least some of the moving platforms may be configured according to different profiles than at least some other of the moving platforms. For example, one moving platform may be equipped with a visible light camera while another moving platform may be equipped with a thermal camera. The multiple moving platforms may be moved to different positions at the first area to capture multiple angles of the target. For example, the first moving platform may be moved to a first position, another moving platform may be moved to a second position, and yet another moving platform may be moved to a third position. If the target is moving, one moving platform may be positioning ahead of the target's movement, another to the left of the target, another to the right of the target, and another behind the target's movement. Yet another may circle the target as it moves.

At step 530, it is attempted to determine the identity of the target (e.g., the target person or inanimate object) via the first moving platform. Attempting to determine the identity of the target is performed via the first type of sensor of the first moving platform. For example, the first type of sensor may comprise a thermal imaging camera. Attempts to determine the identity of the target may use (or attempt to use) thermal images captured by said camera. The precise location (e.g., geographical longitude and latitude coordinates) of the target and/or the time(s) at which the images of the target or other associated data were captured may be recorded, such as for reference when deploying another moving platform. A machine learning algorithm may be used to attempt to determine the identity of the target.

Attempting to determine the identity of the target may be performed using object recognition, such as facial recognition or license plate recognition, on images captured by the first moving platform. Attempting to determine the identity of the target may be performed by the first moving platform or the intermediate or central system. For example, the first moving platform may transmit captured images or other data to the intermediate or central system and the intermediate or central system may attempt to determine the identity of the target. As another example, sound recordings captured by the first type of sensor of the first moving platform may be transmitted back to the intermediate or central system for speech recognition or acoustic signature analysis. As another example, RF signals and/or signatures (e.g., an RF profile) captured by the first moving platform may be transmitted back to the intermediate or central system for RF analysis. An operator may indicate that the one or more images, sound recordings, or other data be sent back to the central station via a GUI. For example, an operator may activate the interface element 318 of the GUI 300 to cause the first moving platform to send the captured images, sound recordings, or other data back to the central station.

In an aspect in which multiple moving platforms are initially deployed to the first area, some or all of the moving platforms may attempt to determine the identity of the target. Additionally or alternatively, the moving platforms may exchange captured data with one another, such as via wireless communication. One or more of the moving platforms may attempt to determine the identity of the target based on data (e.g., captured data, including an RF profile) received from another moving platform. At least one of the moving platforms may communicate the exchanged data to the intermediate or central system for processing at the intermediate or central system.

Attempting to determine the identity of the target may comprise an iterative process of subsequent attempts. For example, multiple images and/or multiple objects represented in images may be subject to object recognition. If a first image or object within an image is insufficient to determine the identity of the target, further images and/or objects within images may be subsequently subject to object recognition to attempt to determine the identity of the target. The multiple images may comprise images captured from multiple angles and/or from different positions within the first area.

At step 540, a second moving platform is moved to the first area to replace or supplement the first moving platform or other moving platforms at the first area. As an example, the second moving platform may be moved to the first area in response to an input to a graphical user interface associated with the central system, such as activation of the interface element 314 of the GUI 300. In some instances, the first moving platform may be called back from its deployment to the first area. For example, an operator may activate the interface element 312 of the GUI 300 to cause the first moving platform to move back to a deployment station associated with the intermediate or central system.

The second moving platform is configured with a second type of sensor that is different from the first type of sensor. Moving the second moving platform to the first area is based on the attempting to determining the identity of the target (e.g., target person or object) via the first moving platform and first type of sensor. For example, moving the second moving platform to the first area may be based on failing to determine the identity of the target via the first moving platform and first type of sensor. As another example, moving the second moving platform to the first area may be based on determining the identity of the target at an unacceptable level of confidence (e.g., below a confidence threshold). As another example, moving the second moving platform to the first area may be based on successfully determining the identity of the target, but it is further determined that additional data should be captured using the second moving platform to supplement the data captured by the first moving platform.

As noted above, the second type of sensor of the second moving platform is different from the first type of sensor of the first moving platform. For example, the second type of sensor may comprise a telephoto camera for taking close-up images while the first type of sensor may comprise a standard visible light camera. The second type of sensor may define, at least in part, a sensor profile of the second moving platform. The sensor profile of the second moving platform may be different from the sensor profile of the first moving platform.

Additionally, the second moving platform may be configured according to a power profile, a flight profile, and a communication profile. One or more of the power profile, flight profile, or communication profile of the second moving platform may differ in at least some aspect with the power profile, flight profile, or communication profile of the first moving platform, respectively. For example, the second moving platform may have full battery power while the first moving platform may have low battery power. As another example, the second moving platform may be configured as a fixed wing design while the first moving platform may be configured as a rotary design. As yet another example, the second moving platform may be configured for cellular wireless communication while the first moving platform may be configured for satellite wireless communication. Related to the above types of profiles, moving the second moving platform to the second area may be based on one or more environmental conditions at the first area, such as wind speed, precipitation, or light level.

The determination to move the second moving platform to the first area may be performed by the first moving platform and such determination may be communicated back to the intermediate or central system. The determination to move the second moving platform to the first area may be performed based on data exchanged between the first moving platform and other moving platforms at the first area. Additionally or alternatively, such a determination may be performed by the intermediate or central system. The determination to move the second moving platform may be performed using a machine learning algorithm. A determination to move the first moving platform away from the first area (e.g., back to a deployment station) may be also performed using a machine learning algorithm.

At step 550, the identity of the target is determined via the second moving platform and second type of sensor. The identity of the target may be based on images or other data captured by the second moving platform using the second type of sensor. Techniques used to determine the identity of the target may be the same or similar as those used to attempt to determine the identity of the target via the first moving platform and first type of sensor. Such techniques may include subjecting captured images to object (e.g., facial) recognition, for example. Determining the identity of the target may be facilitated further by the power profile, flight profile, and/or communication profile of the second moving platform.

Determining the identity of the target may be performed by the second moving platform, the intermediate or central system, or a combination thereof. For example, an operator may activate the interface element 318 to request that the second moving platform transmit data (e.g., captured images) to the central system. The central system may analyze the requested data to determine the identity of the target. In an aspect in which multiple moving platforms are deployed along with the second moving platform, the multiple moving platforms and second moving platforms may exchange captured data between each other. The identity of the target may be determined based on the exchanged data. The exchanged data may be subjected to a machine learning algorithm to determine the identity of the target.

Figure 6:
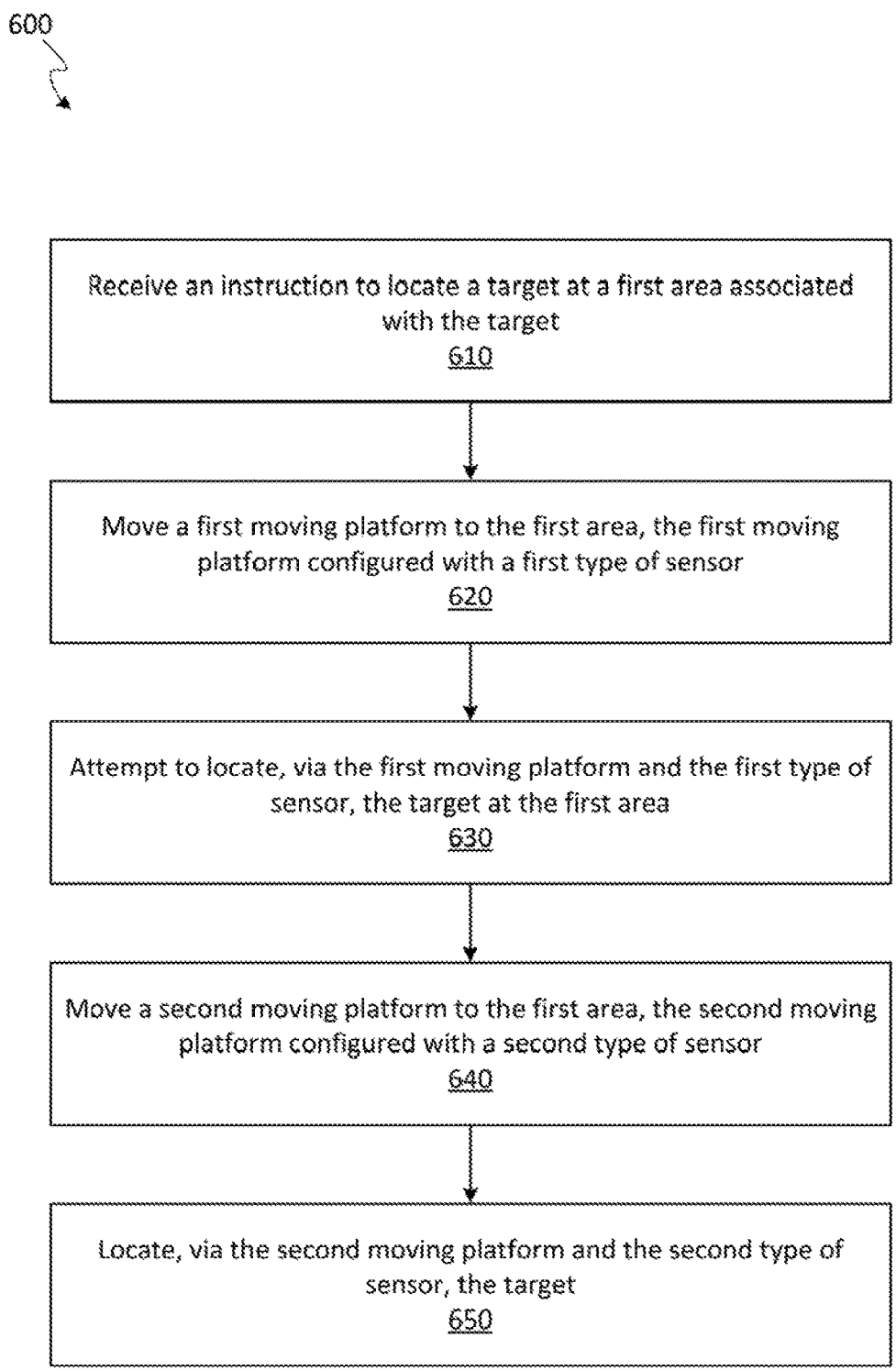
FIG. 6 illustrates a method flowchart according to an aspect of the application.

FIG. 6 illustrates a method 600 for locating a target at a first area using one or more moving platforms, such as the moving platform(s) 18 of FIGS. 1A and 2. The target may be a person or an inanimate object. Example inanimate objects include a road vehicle, a plane, a boat, or an animal (e.g., a pet). The subject target of the method 600 is generally contemplated to be a target with a known identity. The method 600 may be initiated for any of several purposes. For example, the method 600 may be used to locate stolen property (e.g., a stolen car) or a lost pet. The method 600 may be used in a search and rescue operation to locate a lost or missing person. The method 600 may be further used to locate a person and provide cellular service to that person.

At step 610, an instruction is received to locate, via one or more moving platforms, a target at a first area associated with the target. An operator may enter the instruction via a graphical user interface, such as the GUI 300 of FIG. 3. The operator may activate the interface element 320 of the GUI 300 to enter the instruction.

As noted, the target may be a target person or an inanimate object. The target may be a lost person or a person needing cellular service. The target may be stolen property, such as a car. The target may be a lost pet or other animal. The first area may be an area at which the target is located generally (although an exact position within the first area may not be known) or is expected to be located generally. The first area may be defined according to an address, property boundary, geographical coordinates, or a distance from a geographical point of reference, as some examples. The instruction may be provided via an intermediate or central system (e.g., the intermediate system 20 or the central system 14 of FIG. 1A). The instruction may be downloaded to a moving platform to effectuate locating the target.

The instruction may indicate one or more identifiers of the target, such as images of the target or the target's face. Other example identifiers may include an RF signal, such as a cellular RF signal signature of the target's cell phone. Another example identifier may include a cell phone's or cell phone subscriber's identifier, such an international mobile subscriber identity (IMSI) number stored on the cell phone's subscriber identity module (SIM) card. Yet other example identifiers include a license plate number or an acoustic signature associated with the target.

At step 620, a first moving platform is moved (e.g., caused to be moved) to the first area associated with the target based on the instruction. The first moving platform may be moved to the first area in response to an input to a graphical user interface associated with the central system, such as activation of the interface element 314 of the GUI 300. The first moving platform is configured with a first type of sensor. The first moving platform may receive the instruction via a deployment station (e.g., the deployment station 22 of FIG. 1A) and/or wirelessly. The first moving platform may be moved from the deployment station.

As indicated above, the first moving platform is configured with at least a first type of sensor, which may define, at least in part, a sensor profile of the first moving platform. The first sensor type may comprise, for example, a visible light (daytime) camera, a night-vision camera, an infrared camera, a thermal imaging camera, a microphone, or an RF sensor. The first moving platform may be configured according to a power (battery) profile, a communication profile, and a flight profile. The first moving platform may be configured according to a capacity to provide cellular service to areas proximate the first moving platform. The first moving platform may be configured as a mobile cellular base station to effectuate communication between the target (or target person's mobile device) and a stationary wireless base station (e.g., the wireless base station 16 of FIG. 1A) that is otherwise too far away from the target or inoperable.

In some aspects, additional moving platform may be moved to the first area to effectuate the instruction. Each of the multiple moving platforms may be moved to different positions at the first area, such as to capture images of different portions of the first area or images from different angles. The multiple moving platforms or a subset thereof may be configured similarly to one another or configured differently from one another.

At step 630, it is attempted to locate, via the first moving platform and the first type of sensor, the target at the first area. Attempting to locate the target may comprise determining a location of the target, such as a location within the first area. The location of the target may be defined according to a set of geographical coordinates, for example. The location of the target may be defined according to an address or property identifier, as other examples.

As an example, attempting to locate the target at the first area may comprise capturing one or more images of the first area (or portion thereof). The one or more images may be captured from various angles or from various distances. Said images from various angles or from various distances may be captured by additional moving platforms at the first area besides the first moving platform. The one or more images may be subject to object recognition (e.g., facial recognition) to attempt to identify the target in the one or more images. The object recognition may be based on one or more known images of the target, such that an attempt is made to match a recognized object in the analyzed images with the known image(s) of the target. As another example, attempting to locate the target may comprise capturing an RF or cellular signal signature at the first area. The captured RF or cellular signal signature may be analyzed to compare the captured signature with a known signature associated with the target. A cellular signal may also indicate a mobile device identifier (e.g., the IMSI number from the cellular device's SIM card) which may be compared to a known mobile device identifier associated with the target.

Attempting to locate the target at the first area may be performed as an iterative process of subsequent attempts. For example, object recognition may be performed on a first set of images of the first area. If this is not successful in recognizing the target in the first set of images, a second set of images may be captured and subsequently subject to object recognition to attempt to recognize the target in the second set of images.

The attempting to locate the target may be performed, at least in part, by the moving platform. In an aspect in which multiple moving platforms are initially deployed to the first area, the attempting to locate the target may be performed by one or more of the multiple moving platforms and using data (e.g., captured data) exchanged between one or more of the multiple moving platforms. For example, a moving platform may perform object recognition or cellular signature analysis on captured images or cellular signals, respectively. Additionally or alternatively, the attempting to locate the target may be performed, at least in part, by the intermediate or central system. For example, the moving platform may transmit captured data to the intermediate or central system for processing. The attempting to locate the target at the first area may be performed using a machine learning algorithm. The moving platform may transmit captured data in response to an operator activating the interface element 318 to request said data from the moving platform.

In some instances, the target may move beyond the first area as the first moving platform is attempting to locate the target. That is, the target may move to a second area. Accordingly, it may be necessary for the first moving platform to move from the first area to the second area in attempts to locate/track the target.

At step 640, a second moving platform is moved (e.g., caused to be moved) to the first area, such as to replace or support the first moving platform in locating the target. The second moving platform may be moved to the first area in response to an input to a graphical user interface, such as activation of the interface element 314 of the GUI 300. The second moving platform is configured with a second type of sensor that is different from the first type of sensor of the first moving platform. The second moving platform may be configured with a different sensor profile than the sensor profile of the first moving platform. The second moving platform also may be configured differently from the first moving platform with respect to power, flight, and communication (including capabilities as a mobile cellular base station) profiles. Moving the second moving platform to the first area may be initiated by the first moving platform or the intermediate or central system. A determination to move the second moving platform to the first area may be performed using a machine learning algorithm. A determination to move the first moving platform away from the first area (e.g., back to a deployment station) may be also performed using a machine learning algorithm.

Moving the second moving platform to the first area is based on the attempting to locate the target via the first type of sensor of the first moving platform. Moving the second moving platform to the first area may be based on the first moving platform being unable to locate the target. For example, the first type of sensor may be unsuitable to a current nighttime search and the second moving platform having a night-vision camera (i.e., the second type of sensor) may be moved to the first area to more effectively search for the target. Moving the second moving platform to the first area may be based on data captured by the first moving platform using the first type of sensor. For example, images captured by the first moving platform may be out of focus or under- or over-exposed. Further, the target may be simply not depicted in any of the captured images.

Moving the second moving platform to the first area may be further based on the power, flight, or communication profile of the second moving platforms, particularly with respect to any differences between the corresponding profile(s) of the first moving platform. For example, the first moving platform may have a low battery level while the second moving platform has a high battery level. As another example, the first moving platform may be configured for limited altitudes while the second moving platform may be configured for the high altitudes necessary or useful for locating the target. As another example, the first moving platform may be configured for only terrestrial cellular communication. The first area, however, may be remote from any cellular network. Thus, the second moving platform may be configured for satellite communication so that the second moving platform can report back positions, captured data, etc. to the intermediate or central system. Relatedly, moving the second moving platform to the first area may be based on one or more environmental factors at the first area, such as wind speed, light level, or precipitation.

Moving the second moving platform may be based on estimating the location of the target, but only at an unacceptable confidence level (e.g., below a confidence threshold). Thus, the second moving platform may be moved to the first area to preferably estimate or determine the target at a higher, acceptable confidence level (e.g., satisfying a confidence threshold). Moving the second moving platform to the first area may be based on the first moving platform locating the target. Yet, for example, further data relating to the target and/or first area is desired but the first moving platform is unable to capture or determine such further data.

At step 650, the target is located via the second moving platform and the second type of sensor. For example, the second moving platform may determine the location of the target using the second type of sensor. As another example, the intermediate or central system may determine the location of the target based on data captured by the second moving platform and transmitted back to the intermediate or central system. The data captured by the second moving platform may be transmitted back to the intermediate or central system in response to an input to a graphical user interface, such as activation of the interface element 318 of the GUI 300. The target may be located at the first area. In some aspects, the target may be located at a second area, such as if the target was a moving target (e.g., a moving vehicle or roving animal). Locating the target may comprise the second moving platform tracking the target as the target moves.

Locating the target via the second type of sensor of the second moving platform may be performed according to one or more of the techniques that were implemented or may have been implemented in attempting to locate the target at step 630. For example, the second moving platform may capture one or more images at the first area. The captured images may be subject to object recognition (e.g., facial recognition or license plate recognition) to recognize the target in the one or more images.

The image timestamp for images (or other data) that do depict the target may be associated with the location of the target. For example, the intermediate or central system may record, as a pair, a determined location of the target and the time that the target was identified at the location. Movement of the target may be indicated by a sequences of location/ time pairs.

The second moving platform may be provided with data to facilitate locating the target. Such data may have been determined in attempting to locate the target via the first type of sensor of the first moving platform, such as an indication of those portions of the first area in which the first moving platform already captured images or other data or otherwise covered. The second moving platform may be provided the location of the first moving platform at the first area, for example. The second moving platform may be provided data already captured by the first moving platform, such as images already captured by the first moving platform. Such data provided to the second moving platform may be provided by the intermediate or central system, such as via a wired connection before the second moving platform is deployed or via a wireless connection after the moving platform is deployed. Such data provided to the second moving platform may be provided by the first moving platform (or other additional moving platforms already at the first area) in a wireless data exchange with the second moving platform at the first area.

In some aspects, the target may be located at the first area using additional moving platforms that were moved to the first area based on the attempting to locate the target via the first moving platform and the first type of sensor. The additional moving platforms may be configured with the same or different sensor profile as the second moving platform. The additional moving platforms may be moved to different positions within the first area than the second moving platform. For example, the target may be located via a third moving platform using the second type of sensor. Or the target may be located via a third moving platform using a third, different type of sensor. The third moving platform may be moved to the same position within the first area as the second moving platform or to a different position within the first area as the second moving platform. The third moving platform may captures images or other data from a different angle than the second moving platform. Additionally or alternatively, the target may be located via a fourth moving platform using a third type of sensor, different than the first and second types of sensors.

The first, second, third, and fourth moving platforms (or combination or sub-combination thereof) may exchange data to facilitate locating the target. The positions of the multiple moving platforms may be used in a triangulation technique to determine the location (e.g., the geographical coordinates) of the target. Triangulation techniques may be also used when three or more moving platforms at the first area are configured with RF sensors and the target emits an RF signal. The three or more moving platforms may each detect the RF signal from the target and exchange data between each other indicating their respective detections of the RF signal. Based on this exchanged data, triangulation techniques may be used to determine the location of the target.

In some aspects, upon locating the target at the first area, the second moving platform (and/or additional moving platforms if such is the case) may track any movements of the target. For example, the target may move from the first area to a second area. The second moving platform may likewise move to the second area to track the target. Further locations of the target may be continuously or intermittently determined during the movement of the target to the second area. Additionally or alternatively, upon locating the target, the second moving platform may circle the target. When circling the target, the second moving platform may capture further images or other data relating to the target. In some aspects, the second moving platform may need to initially circle the target to capture sufficient images or other data to determine the location of the target. While tracking or circling the target, the first or second moving platform may be caused to move or remain within a pre-determined distance from the target.

In some aspects, the second moving platform may provide additional services to the target. For example, the second moving platform may carry food, water, clothing, a light source, medical supplies, rope, a blanket, or other provisions. After locating the target, the second moving platform may land near the target and the target may retrieve such provisions from the second moving platform. The second moving platform may also provide a detectable light or RF "beacon" to the target to facilitate determining a subsequent location of the target or to facilitate tracking the target. The second moving platform may also provide a communication device, such as a 2-way radio or cell phone, to the target.

In some aspects, the method 600 is initiated to not only locate the target but also to enable wireless communication for the target. For example, the method 600 may be initiated to provide cellular service for the target or other persons, such as after a disaster has destroyed one or more nearby stationary cellular base stations. Accordingly, the second moving platform (and/or the first moving platform) may be configured as a mobile cellular base station. The first moving platform may not be configured to enable or sufficiently enable cellular service for the target and this may be one basis for moving the second moving platform to the first area to locate the target. The second moving platform configured with a mobile cellular base station may be moved to the first area to provide cellular service for the target.

The first and/or second moving platforms may be initially deployed at a disaster area before the instruction is received to locate the target. A disaster may comprise a fire, a meteor crash, a plane crash, an avalanche, or a lightning strike, as some examples. The first and/or second moving platforms may be deployed to the disaster area in contemplation of enabling cellular service for the target person or other persons. The first and/or second moving platforms may be deployed to the disaster area responsive to determining that the disaster occurred. The first and/or second moving platforms may remain within the disaster area until receiving the instruction to locate the target and enable cellular service for the target. The disaster area may comprise the first area. Thus, moving the first and/or second moving platform to the first area may comprise moving the first and/or second moving platform from an area within the disaster area (a second area, different from the first area) to the first area.

Upon locating the target, the mobile cellular base station of the second moving platform may establish a cellular connection with a mobile device of the target. Cellular communication from the target's mobile device may be relayed by the second moving platform to another communication medium or network to effectuate communication to and from the target's mobile device. Relaying the target's communications may comprise establishing, by the second moving platform, a connection with an external network via which to relay the target's communications. For example, the second moving platform may relay the target's communications via a satellite link to a satellite network. As another example, the second moving platform may relay the target's communications to a cellular network via a stationary cellular base station that was not destroyed or affected by the disaster. After locating the target and initially providing (or attempting to provide) cellular service to the target, the second moving platform may further move within the first area to provide a best possible signal for the target. Further, after initially providing cellular service to the target, the second moving platform may track and follow the target as the target moves so as to maintain the cellular service to the target.

Such techniques to provide cellular service to the target are not limited to a disaster situation but may be also employed, for example, when the target is located remote from any stationary cellular base stations.

In some aspects, upon locating the target, a message may be generated and sent to an associated party indicating that the target has been located. For example, if the target was a lost or missing person (e.g., a target of a search and rescue mission), personal contacts of the lost or missing person may be notified that the person was found. Further, emergency or rescue personnel may be notified to assist in rescuing the lost or missing person. For example, a helicopter may be deployed to the target's location. If the target was a lost or missing inanimate object (e.g., a stolen car), the owner of such object may be notified that the object was located and where the object is located. Further, law enforcement may be notified so that the law enforcement may retrieve a target object from the determined location or arrest a target person at the determined location.

While the system and method have been described in terms of what are presently considered specific embodiments, the disclosure need not be limited to the disclosed embodiments. It is intended to cover various modifications and similar arrangements included within the spirit and scope of the claims, the scope of which should be accorded the broadest interpretation to encompass all such modifications and similar structures. The present disclosure includes any and all embodiments of the following claims.

What is claimed is:

1. A method comprising:
receiving an instruction to determine an identity of an object, initially having an unknown identity, associated with a target having a known identity, wherein the identity of the object is specific to the object and the identity of the target is specific to the target;
causing to move a first moving platform to an area associated with the target, wherein the first moving platform is configured with a first type of sensor;
locating, via the first moving platform, the target at the area;
attempting to determine, via the first moving platform and the first type of sensor, the identity of the object associated with the target;
causing to move a second moving platform to the area based on the attempting step, wherein the second moving platform is configured with a second type of sensor different from the first type of sensor of the first moving platform; and
determining, via the second moving platform and the second type of sensor, the identity of the object associated with the target,
wherein the causing to move the second moving platform to the area is based on at least one of wind speed at the area and precipitation at the area.

2. The method of claim 1, wherein the first type of sensor or the second type of sensor comprise at least one of a visible light camera, a thermal imaging camera, a night-vision camera, a microphone, and a radio frequency (RF) sensor.

3. The method of claim 1, wherein the causing to move the second moving platform to the area is based on a difference between a power profile of the first moving platform and a power profile of the second moving platform, and wherein a power profile relates to at least one of a maximum battery capacity, a remaining battery power level, a maximum flight time, and a remaining flight time.

4. The method of claim 1, wherein the causing to move the second moving platform to the area is based on a difference between a flight profile of the first moving platform and a flight profile of the second moving platform, and wherein a flight profile relates to at least one of flight distance, flight time, flight speed, night flight capability, rotary design, and fixed wing design.

5. The method of claim 1, wherein the causing to move the second moving platform to the area is based on a difference between a communication profile of the first moving platform and a communication profile of the second moving platform, and wherein a communication profile relates to at least one of cellular communication capabilities, satellite communication capabilities, wireless communication capabilities, wireless communication range, and capabilities to function as a cellular base station.

6. The method of claim 1, wherein the causing to move the second moving platform to the area is based on failing to determine, via the first moving platform and the first type of sensor, the identity of the object associated with the target.

7. The method of claim 1, wherein the second type of sensor comprises an imaging sensor and the object associated with the target is determined based on one or more images captured by the imaging sensor.

8. The method of claim 7, wherein the identity of the object associated with the target is determined using object recognition on the one or more images.

9. The method of claim 7, wherein the one or more images comprises at least two images captured from different angles with respect to at least one of the target or the object associated with the target.

10. The method of claim 1, wherein the determining the identity of the object associated with the target comprises determining a first activity of the target dependent upon the object occurring during a first time period and a second activity of the target occurring during a second time period subsequent to the first time period, and wherein the second activity is the same as the first activity or different from the first activity.

11. The method of claim 1, wherein a computing system, remote from the area, causes the second moving platform to move to the area based on the attempting step.

12. A system comprising:
   a graphical user interface (GUI);
   one or more processors; and
   memory storing instructions that, when executed by the one or more processors, effectuate operations comprising:
      receiving an instruction to determine an identity of an object, initially having an unknown identity, associated with a target person having a known identity, wherein the identity of the object is specific to the object and the identity of the target is specific to the target;
      causing to move, based on a first operator interaction with the GUI, a first moving platform to an area associated with the target person, wherein the first moving platform is configured with a first type of sensor,
      locating, via the first moving platform, the target person at the area;
      attempting to determine, based on data captured by the first moving platform using the first type of sensor, the identity of the object associated with the target person;
      causing to move, based on the attempting step and a second operator interaction with the GUI, a second moving platform to the area, wherein the second moving platform is configured with a second type of sensor different from the first type of sensor of the first moving platform; and
      determining, based on data captured by the second moving platform using the second type of sensor, the identity of the object associated with the target person, wherein the causing to move the second moving platform to the area is based on at least one of wind speed at the area and precipitation at the area.

13. The system of claim 12, wherein the instruction is input to the system via a third operator interaction with the GUI.

14. The system of claim 12, wherein the data captured by the first moving platform using the first type of sensor is received by the system based on a third operator interaction with the GUI.

15. The system of claim 12, wherein the operations further comprise:
   transmitting data, based on a third operator interaction with the GUI, to the second moving platform, wherein the data captured by the second moving platform using the second type of sensor is based on the data transmitted to the second moving platform.

16. The system of claim 15, wherein the data transmitted to the second moving platform comprises at least one of the data captured by the first moving platform using the first type of sensor, a position of the first moving platform at the area, a sensor profile of the first moving platform, a power profile of the first moving platform, a flight profile of the first moving platform, and a communication profile of the first moving platform.

17. The system of claim 12, wherein the operations further comprise:
   outputting, via a display area of the GUI, image data captured by at least one of the first moving platform and the second moving platform.

18. A system comprising:
   a first moving platform configured with a first type of sensor;
   a second moving platform configured with a second type of sensor different from the first type of sensor of the first moving platform; and
   a computing system configured to:
      receive an instruction to determine an identity of an object, initially having an unknown identity, associated with a target having a known identity, wherein the identity of the object is specific to the object and the identity of the target is specific to the target;
      cause to move the first moving platform to an area associated with the target,
      locate, via the first moving platform, the target at the area;
      attempt to determine, based on data captured by the first moving platform using the first type of sensor, the identity of the object associated with the target;
      cause to move the second moving platform to the area based on the attempting step; and
      determine, based on data captured by the second moving platform using the second type of sensor, the identity of the object associated with the target,
   wherein the causing to move the second moving platform to the area is based on at least one of wind speed at the area and precipitation at the area.

19. The system of claim 18, wherein the causing to move the second moving platform to the area is based on failing to determine, by the first moving platform and the first type of sensor, the identity of the object associated with the target.

20. A non-transitory computer readable medium including program instructions that when executed by a processor effectuates:
   receiving an instruction to determine an identity of an object, initially having an unknown identity, associated with a target having a known identity, where the identity of the object is specific to the object and the identity of the target is specific to the target;

causing to move a first moving platform to an area associated with the target, where the first moving platform is configured with a first type of sensor;

locating, via the first moving platform, the target at the area;

attempting to determine, via the first moving platform and the first type of sensor, the identity of the object associated with the target;

causing to move a second moving platform to the area based on the attempting step, where the second moving platform is configured with a second type of sensor; and determining, via the second moving platform and the second type of sensor, the identity of the object associated with the target, wherein the causing to move the second moving platform to the area is based on at least one of wind speed at the area and precipitation at the area.

* * * * *

UNITED STATES PATENT AND TRADEMARK OFFICE
CERTIFICATE OF CORRECTION

| | |
|---|---|
| PATENT NO. | : 11,373,397 B2 |
| APPLICATION NO. | : 16/385406 |
| DATED | : April 16, 2019 |
| INVENTOR(S) | : Ross et al. |

It is certified that error appears in the above-identified patent and that said Letters Patent is hereby corrected as shown below:

On the Title Page

Item (57) should read:

ABSTRACT
Methods and systems for operating a moving platform to determine data associated with a target person or object are disclosed. In an example method, a first moving platform configured with a first type of sensor, is caused to move to an area associated with the target. The target is located at the area. An attempt is made to determine, via the first moving platform and the first type of sensor, the object or activity. Based on the attempt, a second moving platform configured with a second type of sensor, is caused to move to the area. The object or activity associated with the target is determined via the second moving platform and the second type of sensor.

Signed and Sealed this
Sixth Day of September, 2022

*Katherine Kelly Vidal*

Katherine Kelly Vidal
*Director of the United States Patent and Trademark Office*